(12) United States Patent
Norieda et al.

(10) Patent No.: US 12,718,501 B2
(45) Date of Patent: Aug. 25, 2026

(54) INFORMATION PROCESSING DEVICE, INFORMATION PROCESSING METHOD, AND COMPUTER-READABLE STORAGE MEDIUM

(71) Applicant: NEC Corporation, Tokyo (JP)

(72) Inventors: Shin Norieda, Tokyo (JP); Kenta Fukuoka, Tokyo (JP); Yoshiyuki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 141 days.

(21) Appl. No.: 18/687,352

(22) PCT Filed: Sep. 3, 2021

(86) PCT No.: PCT/JP2021/032505

§ 371 (c)(1),
(2) Date: Feb. 28, 2024

(87) PCT Pub. No.: WO2023/032171

PCT Pub. Date: Mar. 9, 2023

(65) Prior Publication Data

US 2024/0362871 A1 Oct. 31, 2024

(51) Int. Cl.
*G06T 19/00* (2011.01)

(52) U.S. Cl.
CPC ...... *G06T 19/006* (2013.01); *G06T 2219/024* (2013.01); *G06T 2219/2012* (2013.01)

(58) Field of Classification Search
CPC ........................................................ G06T 19/00
See application file for complete search history.

(56) References Cited

U.S. PATENT DOCUMENTS

2011/0148861 A1* 6/2011 Boellaard ............... G06T 19/00 345/419
2014/0002351 A1* 1/2014 Nakayama ........... H04N 13/366 345/156
2019/0344185 A1* 11/2019 Fargo ...................... G06T 19/20

FOREIGN PATENT DOCUMENTS

JP 2001160154 A 6/2001
JP 2008-159034 A 7/2008
JP 2018-036871 A 3/2018
JP 2018-163420 A 10/2018
JP 2022-076189 A 5/2022

(Continued)

OTHER PUBLICATIONS

English Translation of WO 2018/135304 A1, Jul. 2018 (Year: 2018).*

(Continued)

*Primary Examiner* — Charles Tseng
(74) *Attorney, Agent, or Firm* — Sughrue Mion, PLLC

(57) ABSTRACT

One aim of the present invention is to provide an information processing device whereby a user can be made aware of the audio transmission range in a situation where a virtual space is used and users communicate with each other. This information processing device includes: a detection unit that detects audio generated by a user operating an avatar inside a virtual space; an audio control unit that outputs the audio to a user of an avatar that fulfills prescribed conditions in a relationship with a speaking avatar, being an avatar operated by the user that provided the audio; and a display control unit that changes the display mode for a listener avatar, being an avatar that fulfills the prescribed conditions.

24 Claims, 17 Drawing Sheets

(56) References Cited

FOREIGN PATENT DOCUMENTS

| | | | |
|---|---|---|---|
| WO | 2018/020766 | A1 | 2/2018 |
| WO | 2018/135304 | A1 | 7/2018 |

OTHER PUBLICATIONS

English Translation of JP 2018163420 A, Oct. 2018 (Year: 2018).*

JP Office Action for JP Application No. 2023-544951, mailed on Nov. 19, 2024 with English Translation.

International Search Report for PCT Application No. PCT/JP2021/032505, mailed on Oct. 19, 2021.

English translation of Written opinion for PCT Application No. PCT/JP2021/032505, mailed on Oct. 19, 2021.

Ovice, oVice usage guide—for first-time users—, youtube [video] [online], Mar. 31, 2021, https://www.youtube.com/watch?v=C8r02gYDA50, [Search date: Oct. 7, 2021].

Ovice, oVice CM "Next-generation virtual office! Let's go to work on oVice!" Employee edition 30 seconds|Atsugiri Jason, youtube[video][online], Aug. 9, 2021, https://www.youtube.com/watch?v=alHsaeN8cDw, [Search date: Oct. 7, 2021].

Souta-mama, "Together with Souta! Kindergarten version", voice loudness table & cards, [online], Jun. 27, 2009, http://soutayouchien.blog32.fc2.com/?m&no=73, [Search date: Oct. 7, 2021], pp. 1-27.

Takuta Murakami (flick!/Chief editor), the service called oVice, experienced at the 21st demo of Open Network Lab, was interesting, [online], Oct. 21, 2020, pp. 1-23 https://funq.jp/flick/article/640585/, [Search date: Oct. 7, 2021].

Anonymous (oVice Feedbacks), No directionality required for voice range, [online], May 25, 2021, https://feedback.ovice.io/b/feedbacks/shengno-fan-tongni-zhi-xiang-xinghairanai/, [Search date Oct. 7, 2021].

JP Office Action for JP Application No. 2023-544951, mailed on Mar. 11, 2025 with English Translation.

Japeanse Office Action for JP Application No. 2023-108706, mailed on Jun. 30, 2026 with English Translation.

"[Introduction of exciting games, Part 2] Metal Gear Solid 3 Snake Eater" (Original in Japanese), Aidanoaida [online], Apr. 1, 2020, retrieved on Jun. 19, 2026 from: <https://aida-between.hatenablog.com/entry/MGS3>, (3 pages).

"What are the rules for a nameplate visibility in multiplayer?", reddit [online], Saved on Dec. 23, 2020, retrieved on Jun. 22, 2026 from: <http://web.archive.org/web/20201222160257/https://www.reddit.com/r/Minecraft/comments/tb40f/what_are_the_rules_for_nameplate_visibility_in/>, (1 page).

* cited by examiner 100
200-1
200-2
200-n

START
DETECT VOICE UTTERED BY USER WHO OPERATES AVATAR IN VIRTUAL SPACE
S1
OUTPUT VOICE TO USER OF AVATAR SATISFYING PREDETERMINED CONDITIONS IN RELATIONSHIP WITH SPEAKING AVATAR THAT IS AVATAR OPERATED BY USER WHO HAS UTTERED VOICE
S2
CHANGE DISPLAY MODE OF LISTENING AVATAR THAT IS AVATAR SATISFYING PREDETERMINED CONDITIONS
S3
END

START
S101
HAS VOICE BEEN DETECTED?
No
Yes
SET LISTENING REGION
FROM VOLUME AND FACE DIRECTION
S102
DISPLAY LISTENING REGION
S103
S104
HAS LISTENING AVATAR
BEEN SPECIFIED?
No
Yes
OUTPUT VOICE TO USER OF LISTENING AVATAR
S105
CHANGE DISPLAY MODE OF LISTENING AVATAR
S106
END

Fig.10B

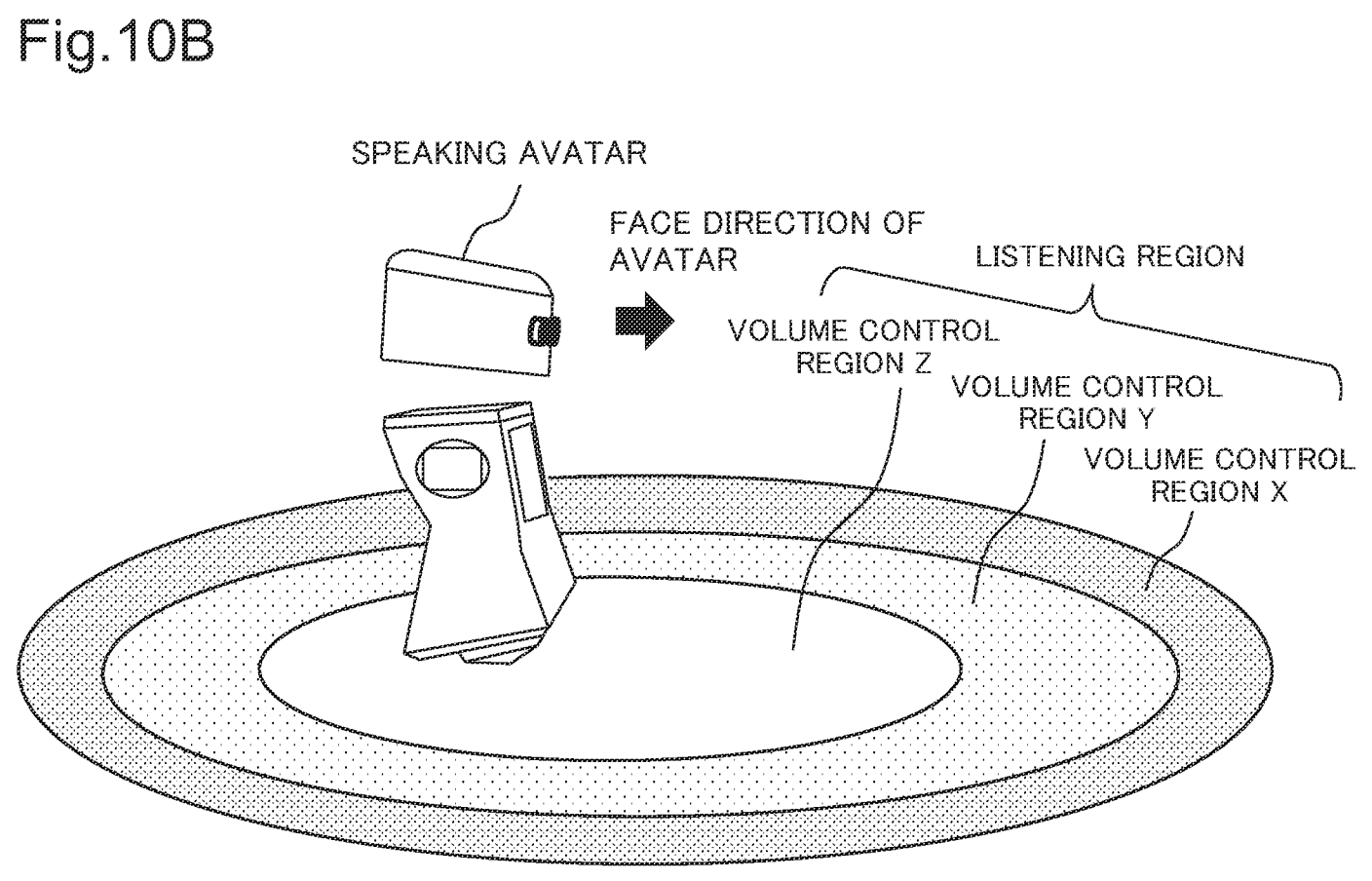

SPEAKING AVATAR

FACE DIRECTION OF AVATAR

LISTENING REGION

VOLUME CONTROL REGION Z

VOLUME CONTROL REGION Y

VOLUME CONTROL REGION X

Fig.11

LISTENING AVATAR B

LISTENING AVATAR A

SPEAKING AVATAR

LISTENING REGION

START
S201
HAS VOICE BEEN DETECTED?
No
Yes
SET LISTENING REGION
FROM VOLUME AND FACE DIRECTION
S202
DISPLAY LISTENING REGION
S203
S204
HAS LISTENING AVATAR BEEN SPECIFIED?
No
Yes
OUTPUT VOICE WITH OUTPUT VOLUME RELEVANT TO
EACH USER OF LISTENING AVATAR
S205
CHANGE DISPLAY MODE OF LISTENING AVATAR
S206
END 90
80
STORAGE MEDIUM
97
DRIVE DEVICE
91
PROCESSOR
92
RAM
96
94
STORAGE DEVICE
98
PROGRAM
93
ROM
95
INPUT/OUTPUT INTERFACE
99
PERIPHERAL DEVICE

INFORMATION PROCESSING DEVICE, INFORMATION PROCESSING METHOD, AND COMPUTER-READABLE STORAGE MEDIUM

This application is a National Stage Entry of PCT/JP2021/032505 filed on Sep. 3, 2021, the contents of all of which are incorporated herein by reference, in their entirety.

TECHNICAL FIELD

The present disclosure relates to a technique for controlling a virtual space.

BACKGROUND ART

There is a technique for a plurality of users to communicate with each other using a virtual space. For example, PTL 1 discloses a technique for arranging an object, in which an image obtained by imaging each user is embedded, in a three-dimensional space and making a call through the three-dimensional space.

In association with the technique for communication between a plurality of users, PTL 2 discloses generating an image in which an object of a person is arranged at a position on an image relevant to a position where the person is in a real space, which is an image relevant to the real space. In the technique of PTL 2, when there is a person on a call, a link connecting objects relevant to the person on the call is generated.

CITATION LIST

Patent Literature

PTL 1: WO 2018/020766 A1
PTL 2: JP 2018-36871 A

SUMMARY OF INVENTION

Technical Problem

In both the techniques of PTLs 1 and 2, it is possible to make a call with a user designated in advance.

Here, a case is considered in which a user uses a virtual space where there are a plurality of avatars. For example, a user operates an avatar indicating himself or herself to move in the virtual space or make a call with another user who operates another avatar. In such a case, when it is necessary to designate a call target in all calls made by the user, it takes time and effort for the operation of the user. On the other hand, even if it is possible to transmit the voice uttered by the user without designating the call target, the user may not know to which user the voice will be transmitted.

The present disclosure has been made in view of the above-mentioned problems, and it is an object of the present disclosure to provide an information processing device and the like through which a user can recognize the transmission range of voice in a situation in which users communicate with each other using a virtual space.

Solution to Problem

An information processing device according to an aspect of the present disclosure includes a detection means for detecting a voice uttered by a user who operates an avatar in a virtual space, a voice control means for outputting the voice to a user of an avatar satisfying predetermined conditions in a relationship with a speaking avatar that is an avatar operated by the user who has uttered the voice, and a display control means for changing a display mode of a listening avatar that is an avatar satisfying the predetermined conditions.

An information processing method according to an aspect of the present disclosure includes detecting a voice uttered by a user who operates an avatar in a virtual space, outputting the voice to a user of an avatar satisfying predetermined conditions in a relationship with a speaking avatar that is an avatar operated by the user who has uttered the voice, and changing a display mode of a listening avatar that is an avatar satisfying the predetermined conditions.

A computer-readable storage medium according to an aspect of the present disclosure stores a program causing a computer to execute processing for detecting a voice uttered by a user who operates an avatar in a virtual space, processing for outputting the voice to a user of an avatar satisfying predetermined conditions in a relationship with a speaking avatar that is an avatar operated by the user who has uttered the voice, and processing for changing a display mode of a listening avatar that is an avatar satisfying the predetermined conditions.

Advantageous Effects of Invention

According to the present disclosure, it is possible to make a user recognize the transmission range of voice in a situation in which users communicate with each other using a virtual space.

BRIEF DESCRIPTION OF DRAWINGS

FIG. 10B is a diagram illustrating another example of the volume control region according to the third example embodiment of the present disclosure.

FIG. 11 is a diagram illustrating an example of a display mode of a listening avatar according to the third example embodiment of the present disclosure.

EXAMPLE EMBODIMENT

Hereinafter, example embodiments of the present disclosure will be described with reference to the diagrams.

First Example Embodiment

An outline of an information processing device of the present disclosure will be described.

Figure 1:
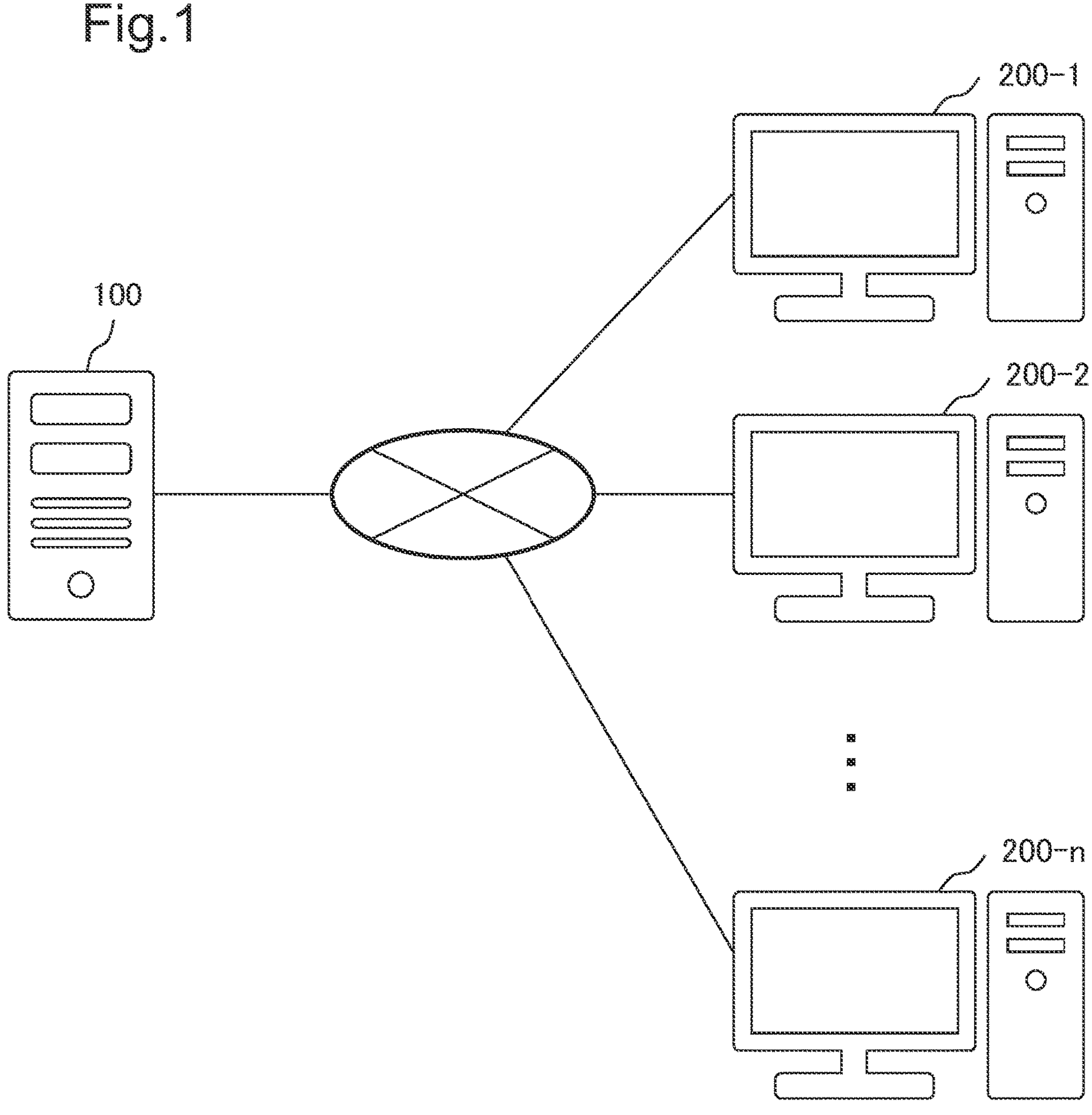
FIG. 1 is a diagram schematically illustrating an example of a configuration including an information processing device according to a first example embodiment of the present disclosure.

FIG. 1 is a diagram schematically illustrating an example of a configuration including an information processing device 100. As illustrated in FIG. 1, the information processing device 100 is communicably connected to user terminals 200-1, 200-2, . . . , and **200-*n* (n is a natural number of 1 or more) through a wireless or wired network. Here, when the user terminals 200-1, 200-2, . . . , and 200-*n* are not distinguished from one another, these are simply referred to as user terminals 200. The user terminal 200 is a device operated by a user. The user terminal 200 is, for example, a personal computer, but is not limited to this example. The user terminal 200 may be a smartphone or a tablet terminal, or may be a device including a goggle-type wearable terminal (also referred to as a head-mounted display) having a display. The user terminal 200 includes an input device such as a keyboard, a mouse, a microphone, and a wearable device that performs an operation based on an operation of the user, and an output device such as a display and a speaker. The user terminal 200** includes at least one of an imaging device and a device capable of reading a voiceprint, a fingerprint, a palm print, an iris, a vein, and the like.

Figure 2:
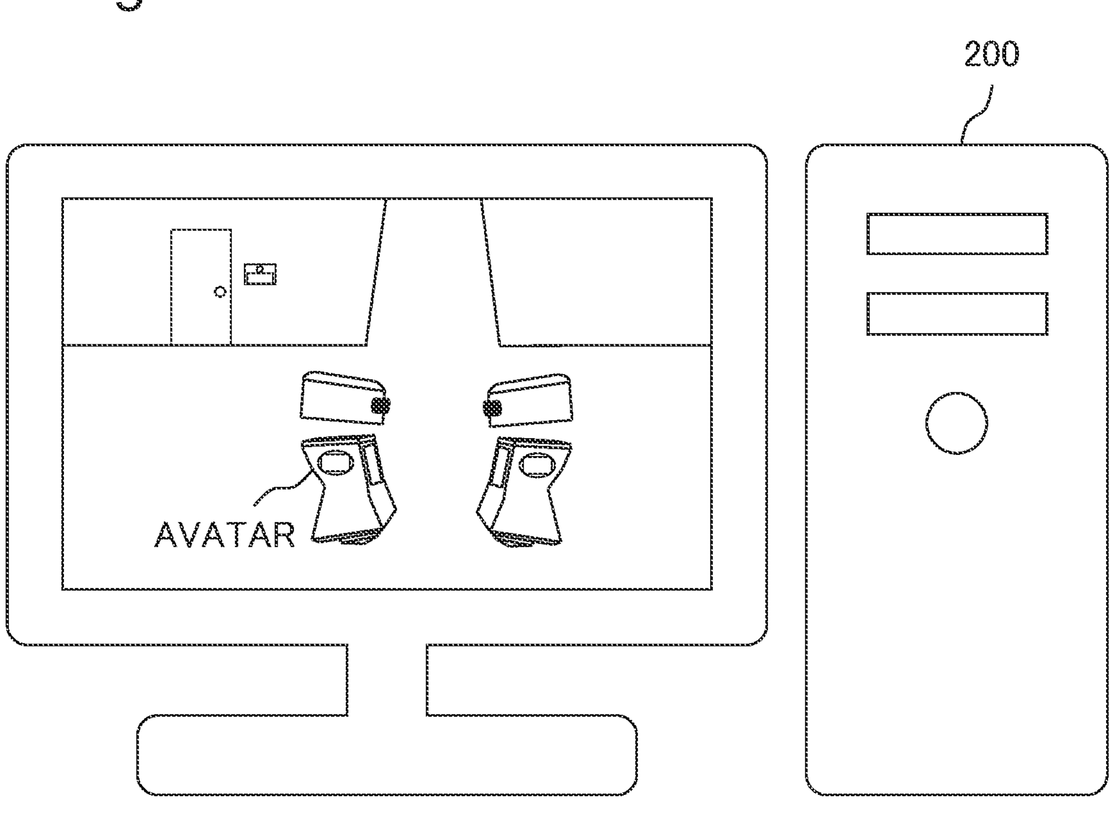
FIG. 2 is a diagram schematically illustrating an example of a virtual space displayed on a user terminal according to the first example embodiment of the present disclosure.

First, a virtual space in the present disclosure will be described. The virtual space is a space shared by a plurality of users, and is a space reflecting the user's operation. The virtual space is also called a virtual reality (VR) space. For example, a virtual space is provided by the information processing device 100. The user terminal 200 displays an image indicating the virtual space. FIG. 2 is a diagram schematically illustrating an example of a virtual space displayed on the user terminal 200. In the example of FIG. 2, a virtual space is displayed on the display of the user terminal 200. As illustrated in FIG. 2, the virtual space includes an avatar. The avatar is an object to be operated by the user. The user uses the virtual space by operating the avatar. For example, the user terminal 200 may display an image of the virtual space of the avatar viewpoint operated by the user. In this case, the image displayed on the user terminal 200 may be updated according to the motion of the avatar. For example, the user may be able to communicate with another user by performing an action on an avatar operated by another user. A device that provides the virtual space may not be the information processing device 100. For example, an external device (not illustrated) may provide the virtual space.

Figure 3:
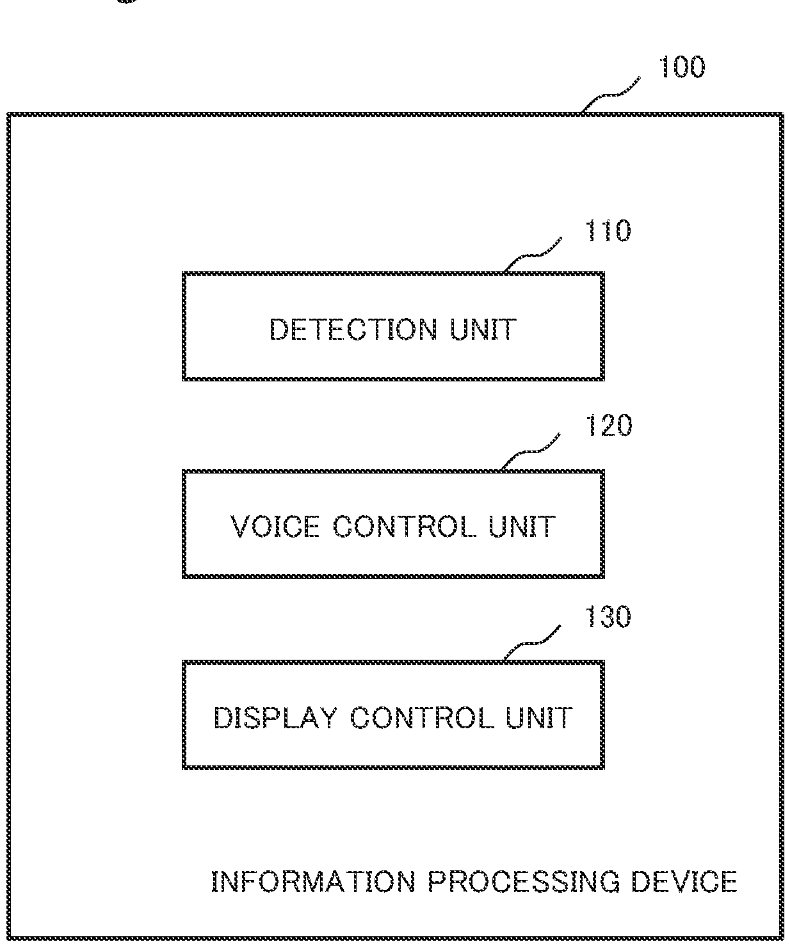
FIG. 3 is a block diagram illustrating an example of the functional configuration of the information processing device according to the first example embodiment of the present disclosure.

FIG. 3 is a block diagram illustrating an example of the functional configuration of the information processing device 100 according to the first example embodiment. As illustrated in FIG. 3, the information processing device 100 includes a detection unit 110, a voice control unit 120, and a display control unit 130.

The detection unit 110 detects a voice uttered by the user who operates the avatar in the virtual space. The detection unit 110 is an example of a detection means.

The voice control unit 120 controls a voice. Here, the user who has uttered the voice is also referred to as a speaking user. The avatar operated by the user who has uttered the voice is also referred to as a speaking avatar. For example, the voice control unit 120 specifies an avatar satisfying predetermined conditions in the relationship with the speaking avatar. The avatar satisfying the predetermined conditions may be, for example, an avatar present within a predetermined distance from the speaking avatar, or may be an avatar present in a predetermined region including the speaking avatar. The predetermined conditions are not limited to this example. The avatar satisfying the predetermined conditions is also referred to as a listening avatar. For example, the voice control unit 120 outputs a voice from the speaking user to the user of the specified avatar. In this manner, the voice control unit 120 outputs a voice to the user of the avatar satisfying the predetermined conditions in the relationship with the speaking avatar that is an avatar operated by the user who has uttered the voice. The voice control unit 120 is an example of a voice control means.

The display control unit 130 controls display of the virtual space. For example, when there is a listening avatar that is an avatar satisfying the predetermined conditions, the display control unit 130 controls the display mode of the listening avatar. For example, the display control unit 130 gives a predetermined symbol or a predetermined color to the listening avatar. The display control unit 130 changes the display mode of the listening avatar that is an avatar satisfying the predetermined conditions. The display control unit 130 is an example of a display control means.

Next, an example of the operation of the information processing device 100 will be described with reference to FIG. 4. In the present disclosure, each step in the flowchart is represented by using a number assigned to each step, such as "S1".

Figure 4:
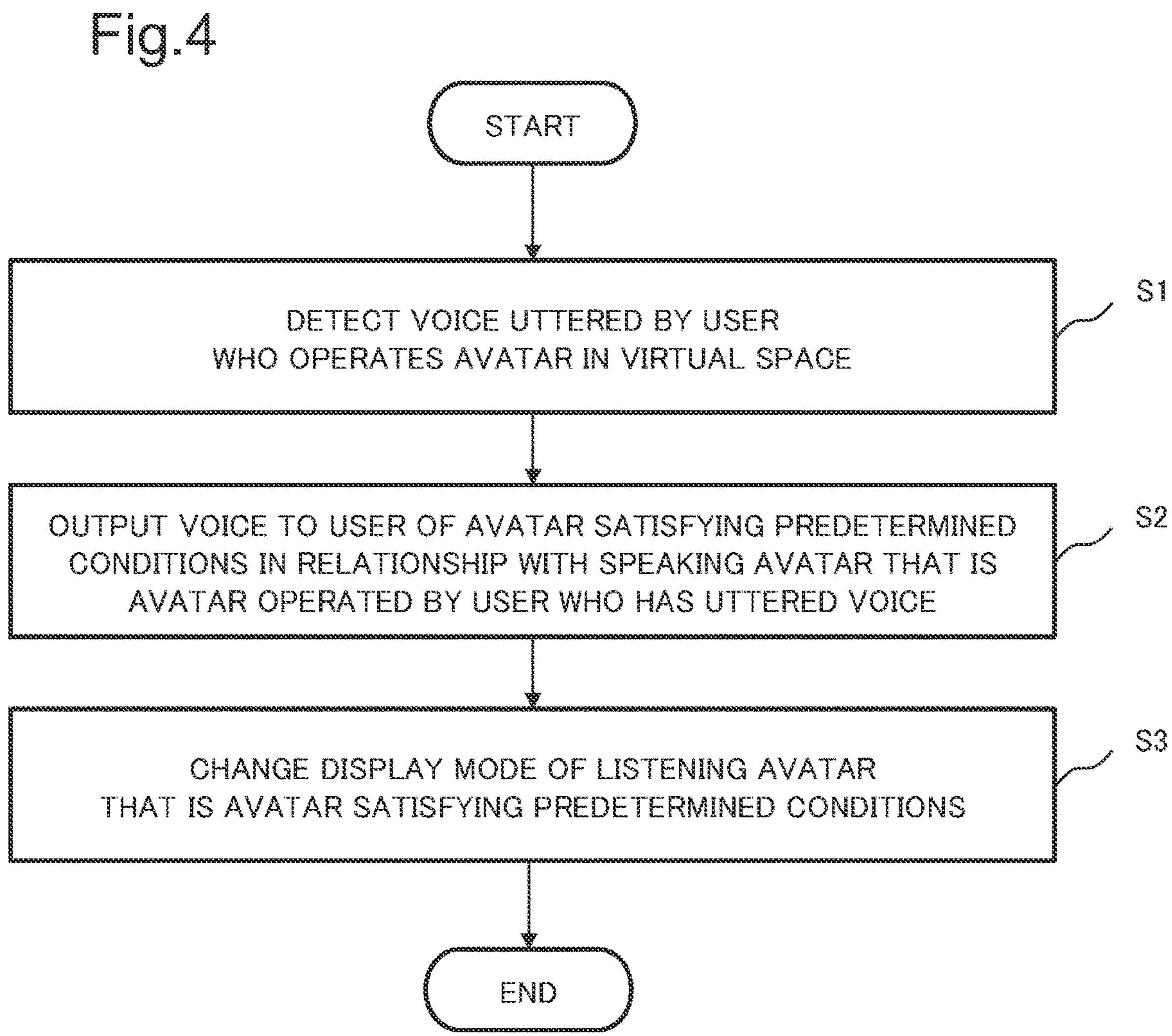
FIG. 4 is a flowchart illustrating an example of the operation of the information processing device according to the first example embodiment of the present disclosure.

FIG. 4 is a flowchart illustrating an example of the operation of the information processing device 100. The detection unit 110 detects a voice uttered by the user who operates the avatar in the virtual space (S1). The voice control unit 120 outputs a voice to the user of the avatar satisfying the predetermined conditions in the relationship with the speaking avatar that is an avatar operated by the user who has uttered the voice (S2). The display control unit 130 changes the display mode of the listening avatar that is an avatar satisfying the predetermined conditions (S3).

As described above, the information processing device 100 according to the first example embodiment detects the voice uttered by the user who operates the avatar in the virtual space, and outputs the voice to the user of the avatar satisfying the predetermined conditions in the relationship with the speaking avatar that is an avatar operated by the user who has uttered the voice. Then, the information processing device 100 changes the display mode of the listening avatar that is an avatar satisfying the predetermined conditions. Therefore, since the information processing device 100 controls the display mode of the avatar of the user to whom the voice is to be output, it is possible to inform the speaking user of which user the voice will be transmitted to. That is, the information processing device 100 of the present disclosure can make the user recognize the voice transmission range in a situation where the users communicate with each other using a virtual space.

Second Example Embodiment

Next, an information processing device according to a second example embodiment will be described. In the second example embodiment, the information processing device 100 described in the first example embodiment will be described in more detail.

[Details of Information Processing Device 100]

Figure 5:
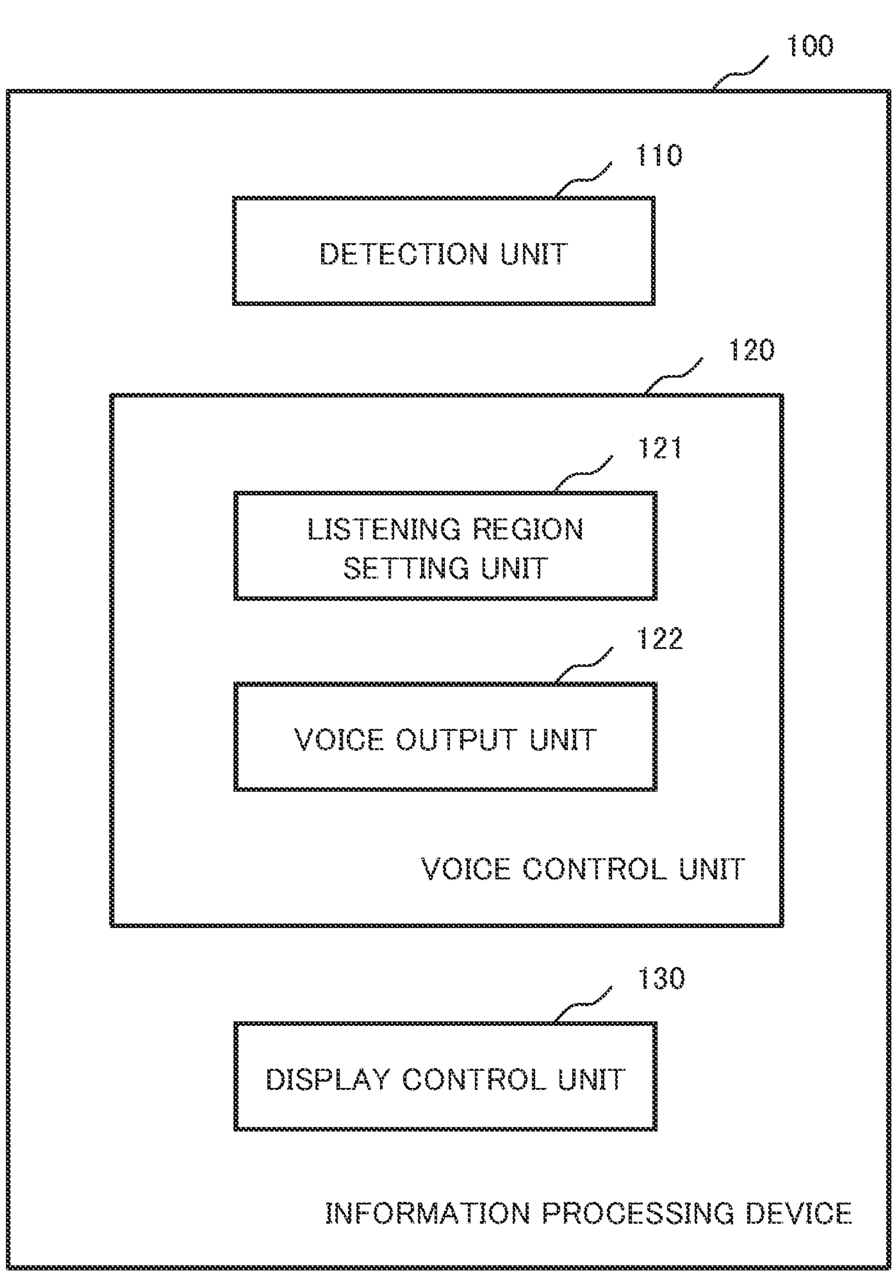
FIG. 5 is a block diagram illustrating an example of the functional configuration of an information processing device according to a second example embodiment of the present disclosure.

FIG. 5 is a block diagram illustrating an example of the functional configuration of the information processing device 100 according to the second example embodiment. As illustrated in FIG. 5, the information processing device 100 includes a detection unit 110, a voice control unit 120, and a display control unit 130.

The detection unit 110 detects a voice uttered by the user. For example, when the user utters a voice, the voice is collected by a microphone or the like included in the user terminal 200. Voice data that is data related to the collected voice is transmitted to the information processing device 100. For example, the detection unit 110 detects the voice uttered by the user by receiving the voice data.

Figure 6A:
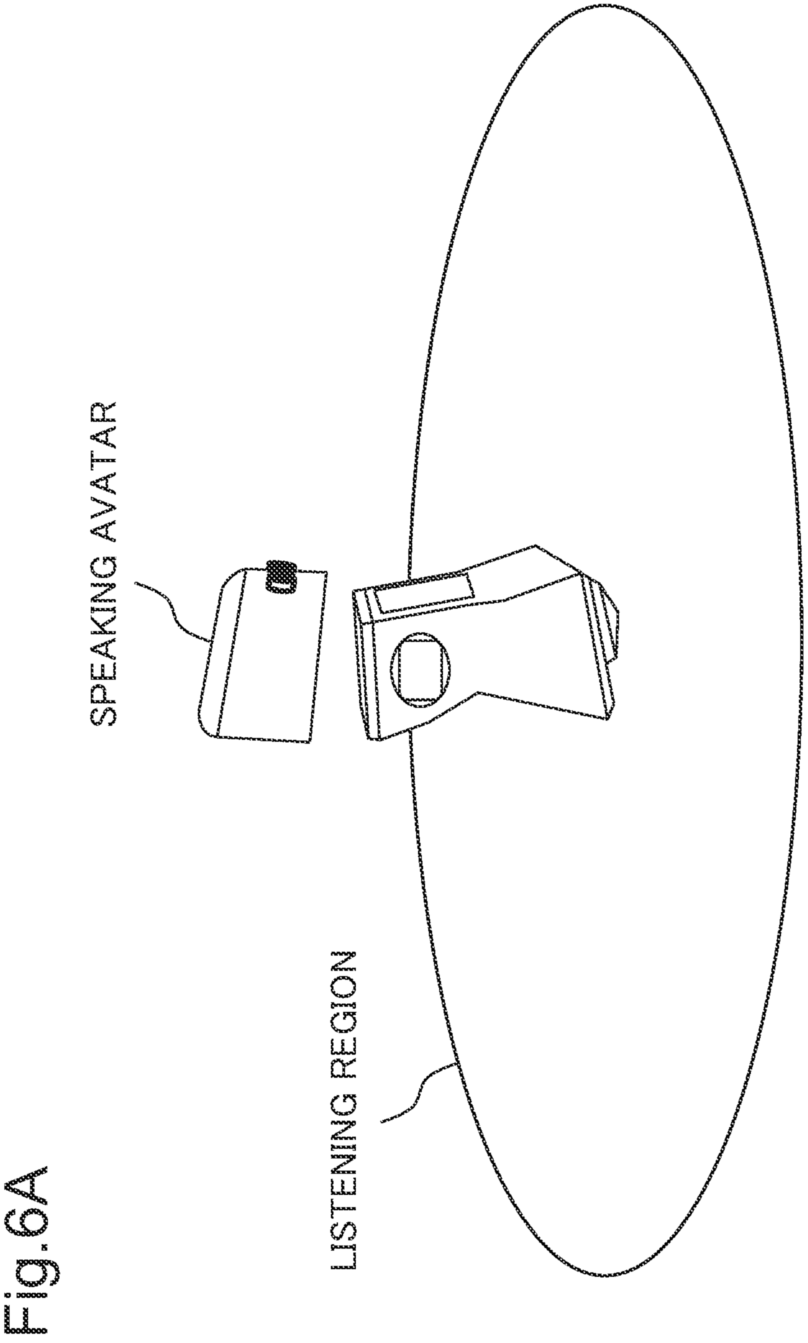
FIG. 6A is a diagram illustrating an example of a listening region according to the second example embodiment of the present disclosure.

The voice control unit 120 includes a listening region setting unit 121 and a voice output unit 122. The listening region setting unit 121 sets a listening region. The listening region is a region including the speaking avatar, and is a region indicating a range where the voice of the speaking user is transmitted. The listening region may be, for example, a range indicating a predetermined distance from the speaking avatar. FIG. 6A is a diagram illustrating an example of a listening region. For example, as illustrated in FIG. 6A, the listening region setting unit 121 may set the listening region in a circular shape centered on the speaking avatar. In this case, other avatars present within the listening region are listening avatars. That is, the voice of the speaking user is output in the user terminal 200 used by the user who operates another avatar present in the listening region. Here, the size of the listening region may be set to a predetermined size for each avatar, or may differ depending on the volume of the voice. Specifically, the listening region setting unit 121 acquires information on the loudness of the voice of the speaking user, that is, the volume from the voice data of the speaking user. When the volume is larger than a predetermined threshold value, the listening region setting unit 121 sets the size of the listening region to be larger than the reference size. When the volume is smaller than the predetermined threshold value, the listening region setting unit 121 sets the size of the listening region to be smaller than the reference size. Without being limited to this example, the size of the listening region may be set in advance for each of a plurality of volume ranges, and the listening region setting unit 121 may determine the listening region according to which range the acquired volume belongs. In this manner, the listening region setting unit 121 may set the listening region according to the volume of the voice uttered by the user.

Figure 6B:
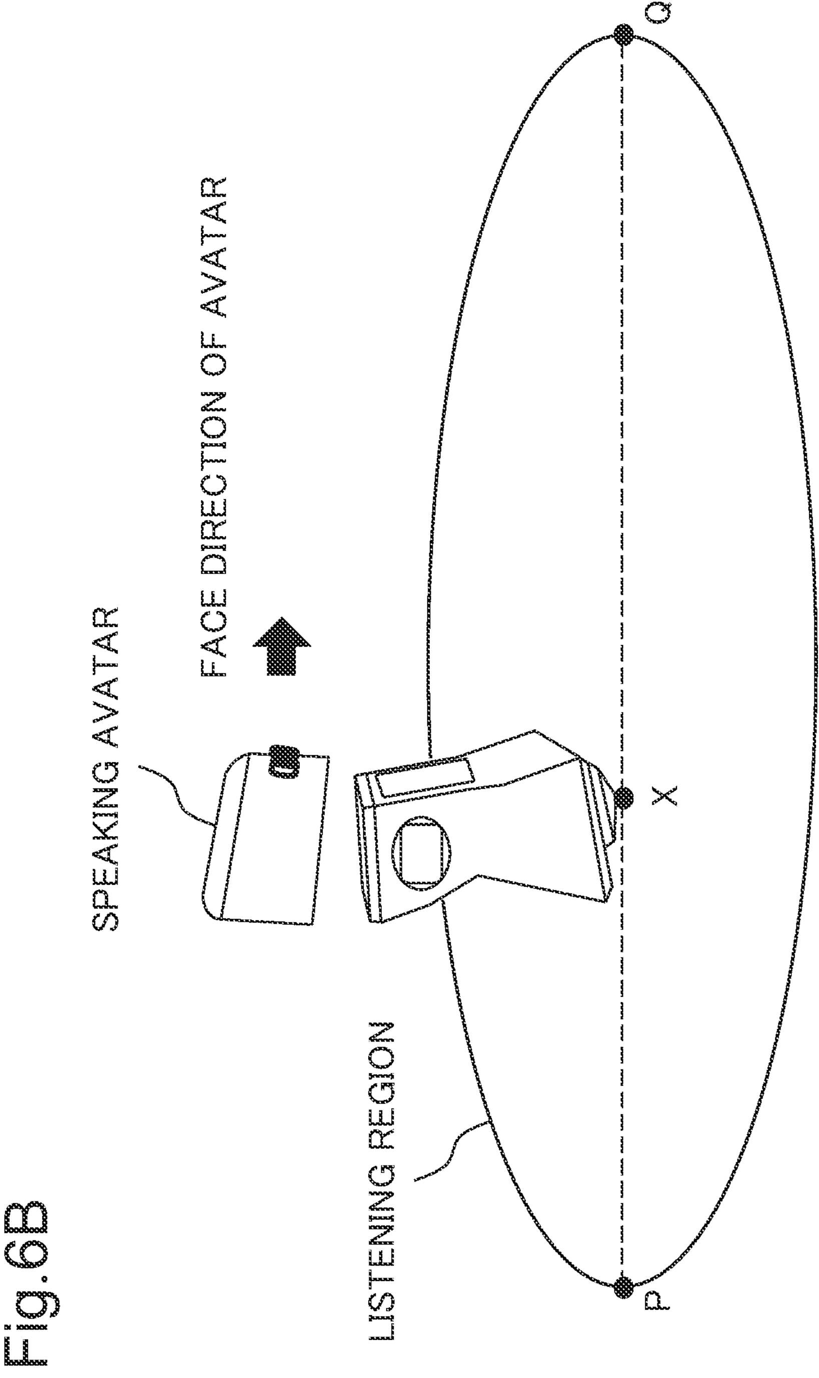
FIG. 6B is a diagram illustrating a second example of the listening region according to the second example embodiment of the present disclosure.

The listening region is not limited to the above example. For example, the listening region may differ depending on the face direction of the speaking avatar. FIG. 6B is a diagram illustrating a second example of the listening region. As illustrated in FIG. 6B, the listening region may be set to be wide in a direction in which the speaking avatar's face is facing and to be narrow in a direction in which the speaking avatar's face is not facing. In the example of FIG. 6B, the speaking avatar at point X is facing in the direction of point Q. Point P indicates a position behind the speaking avatar. The points P, X, and Q are points on a straight line, and the points P and Q are points on the circumference of the listening region. In this case, the distance from the point X to the point Q is longer than the distance from the point X to the point P. Thus, the listening region setting unit 121 may set the listening region to be wide in a direction in which the speaking avatar's face is facing. That is, the listening region setting unit 121 may set the listening region according to the face direction of the speaking avatar.

Figure 6C:
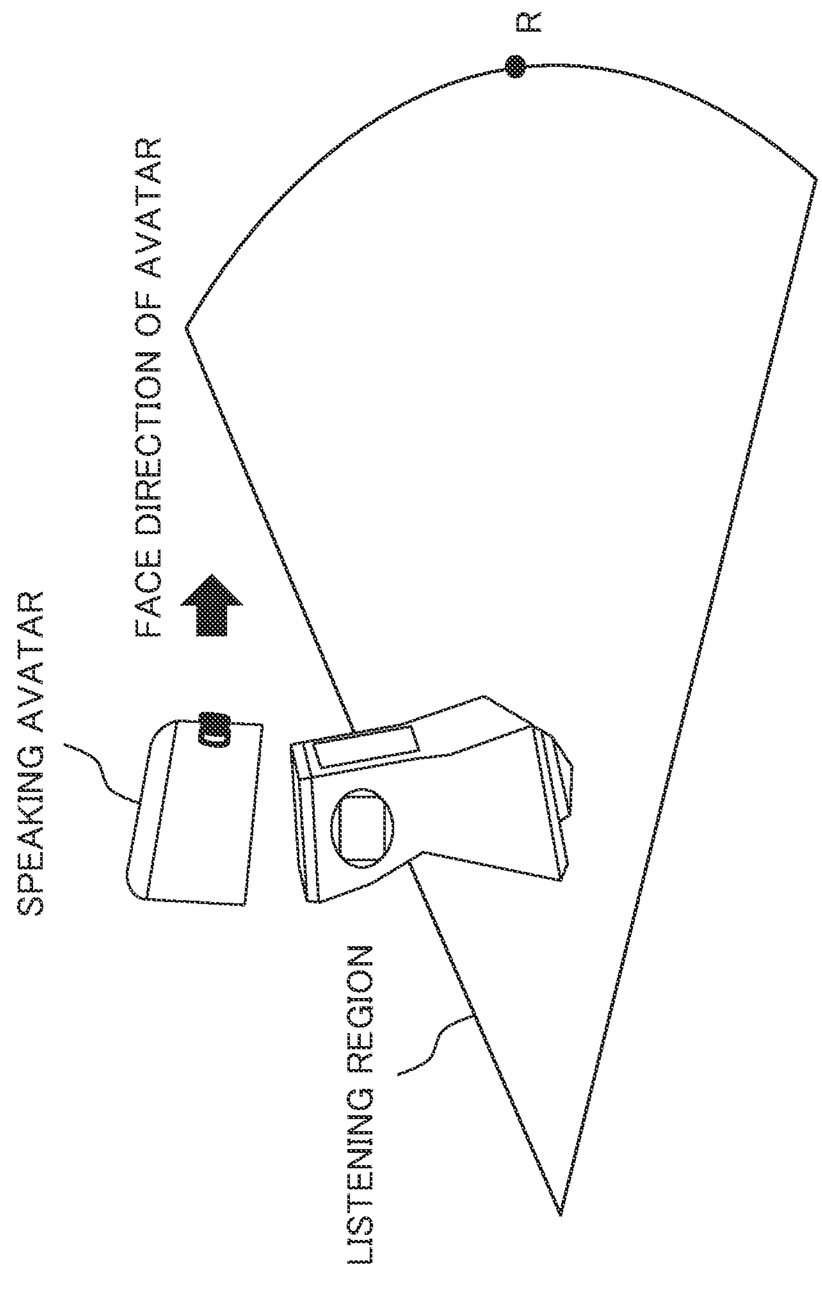
FIG. 6C is a diagram illustrating a third example of the listening region according to the second example embodiment of the present disclosure.

The listening region may be set in different forms. FIG. 6C is a diagram illustrating a third example of the listening region. In the example of FIG. 6C, the listening region is set to a fan shape. In this example, the speaking avatar is facing in the direction of point R. The point R is a point on a fan-shaped arc. That is, also in the example of FIG. 6C, the listening region is set to be wide in the direction in which the speaking avatar's face is facing. Thus, the form of the listening region may be a circular shape or a fan shape, or may be another form such as an ellipse or a polygon.

The voice output unit 122 outputs a voice. Specifically, when another avatar different from the speaking avatar is present in the listening region, the avatar is specified as a listening avatar. Then, the voice output unit 122 outputs a voice to the user terminal 200 used by the user who operates the listening avatar. Here, in the present disclosure, "outputting a voice in the user terminal 200 used by the user who operates the avatar" may be expressed as "outputting a voice to the user of the avatar". The voice output unit 122 may specify another avatar as a listening avatar by detecting that another avatar has entered the listening region. The voice output unit 122 may acquire the position information of another avatar around the speaking avatar and specify the avatar of the position information indicating the position in the listening region, among the pieces of acquired position information, as the listening avatar.

Figure 7:
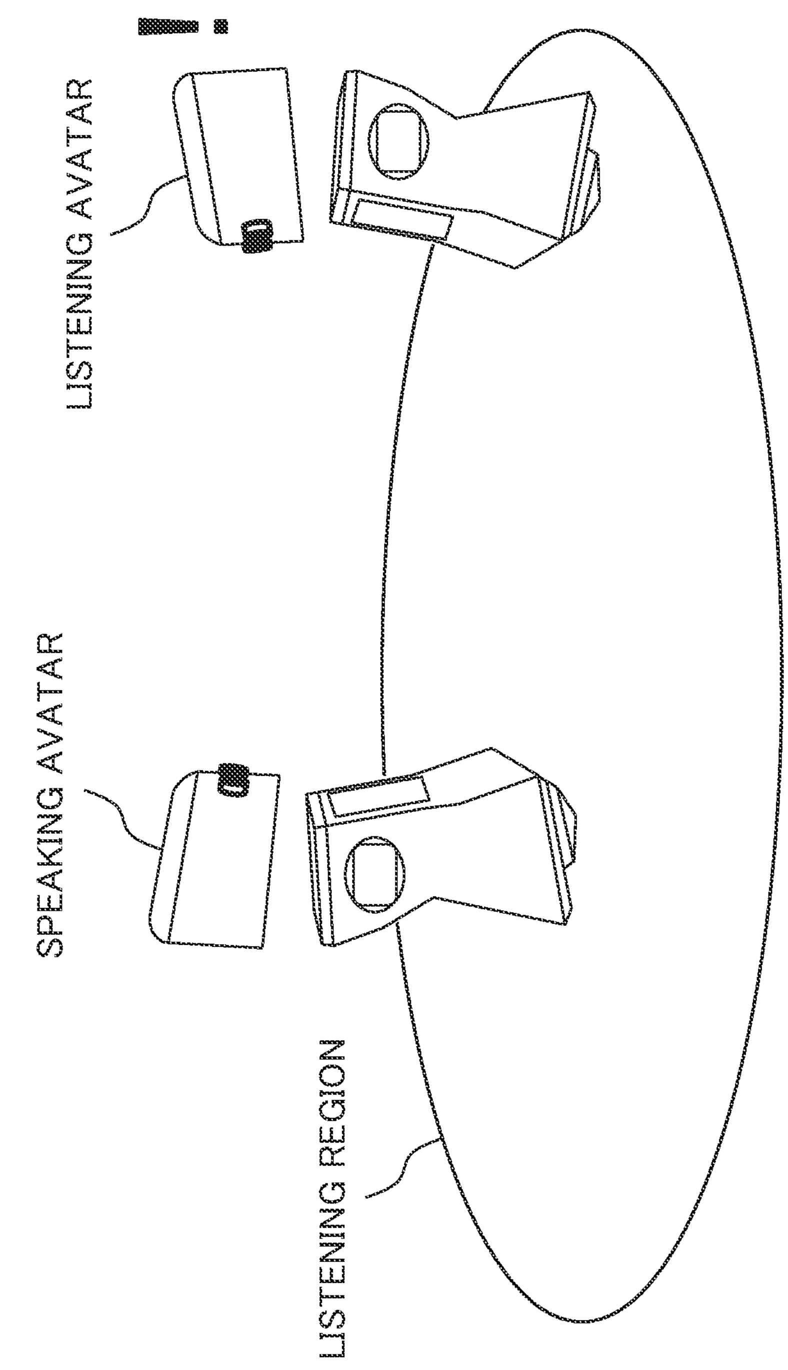
FIG. 7 is a diagram illustrating an example of a display mode of a listening avatar according to the second example embodiment of the present disclosure.

The display control unit 130 controls display of the virtual space. Specifically, the display control unit 130 changes the display mode of the listening avatar. FIG. 7 is a diagram illustrating an example of a display mode of the listening avatar. In the example of FIG. 7, an exclamation mark is added to the listening avatar. For example, the display control unit 130 performs control so that the listening avatar to which an exclamation mark is added is displayed on the user terminal 200 of the speaking user. As a result, the speaking user can visually recognize which avatar is the listening avatar, that is, which user the voice is being transmitted to. The display mode is not limited to this example. For example, the display control unit 130 may add other symbols or characters to the listening avatar, or may change the color of a part or entirety of the listening avatar.

The display control unit 130 may display the listening region. For example, the display control unit 130 displays the listening region set according to the voice of the speaking user on the user terminal 200 of the speaking user. As a result, the speaking user can recognize in which range the voice is transmitted. The display control unit 130 may also display the listening region set according to the voice of the speaking user on the user terminal 200 of another user. As a result, another user can recognize who is speaking.

[Operation Example of Information Processing Device 100]

Figure 8:
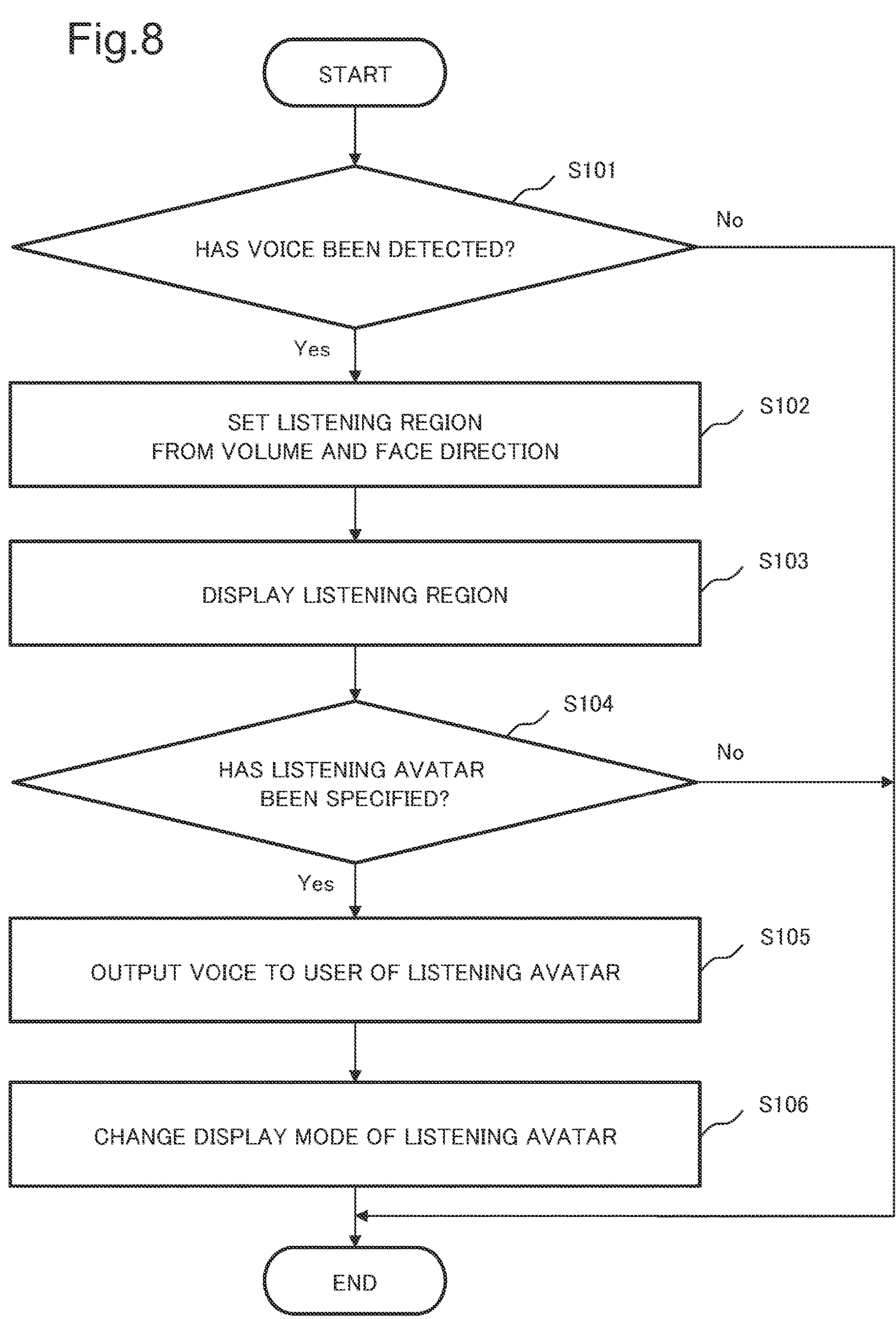
FIG. 8 is a flowchart illustrating an example of the operation of the information processing device according to the second example embodiment of the present disclosure.

Next, an example of the operation of the information processing device 100 will be described with reference to FIG. 8. FIG. 8 is a flowchart illustrating an example of the operation of the information processing device 100. When the detection unit 110 detects a voice ("Yes" in S101), the listening region setting unit 121 sets the listening region from the volume of the voice and the face direction of the speaking avatar (S102). At this time, the listening region setting unit 121 may set the listening region in consideration of at least one of the volume of the voice and the face direction of the speaking avatar. When the detection unit 110 detects no voice ("No" in S101), the information processing device 100 ends the processing.

The display control unit 130 may display the listening region (S103). When the listening avatar is specified by the voice output unit 122 ("Yes" in S104), the voice output unit 122 outputs a voice to the user of the listening avatar (S105). The display control unit 130 changes the display mode of the listening avatar (S106). When no listening avatar is specified by the voice output unit 122 ("No" in S104), the information processing device 100 ends the processing.

In the operation example described above, the processing of S103 may not be performed. The processing of S105 and the processing of S106 may be performed in reverse order.

As described above, the information processing device 100 according to the second example embodiment detects the voice uttered by the user who operates the avatar in the virtual space, and outputs the voice to the user of the avatar satisfying the predetermined conditions in the relationship with the speaking avatar that is an avatar operated by the user who has uttered the voice. Then, the information processing device 100 changes the display mode of the listening avatar that is an avatar satisfying the predetermined conditions. Therefore, since the information processing device 100 controls the display mode of the avatar of the user to whom the voice is to be output, it is possible to inform the speaking user of which user the voice will be transmitted to. That is, the information processing device 100 according to the second example embodiment can make the user recognize the voice transmission range in a situation where the users communicate with each other using a virtual space. The information processing device 100 may display the listening region. As a result, the information processing device 100 can inform the speaking user of which user the voice will be transmitted to. The information processing device can also inform the user of who is speaking.

The information processing device 100 according to the second example embodiment sets the listening region that is a region including the speaking avatar, sets the avatar present in the listening region as a listening avatar, and outputs a voice to the user of the listening avatar. As a result, the information processing device 100 can transmit a voice to another user even if the speaking user does not designate a target user.

The information processing device 100 according to the second example embodiment may set the listening region according to the volume of the voice uttered by the user. As a result, the information processing device 100 can set the listening region to be large when the volume is large and set the listening region to be small when the volume is small, for example. Therefore, the user can freely determine a range to which the user desires to transmit the voice by controlling the loudness of the voice. The information processing device 100 may determine the listening region according to the face direction of the listening avatar. As a result, the information processing device 100 can set a larger listening region in a direction in which the listening avatar's face is facing than in a direction in which the listening avatar's face is not facing, for example. Therefore, the user directs his/her avatar in the direction of another avatar to which the user desires to transmit the voice. In this case, it becomes easy for the user of another avatar to determine whether the utterance is given toward himself or herself. As described above, the information processing device 100 can provide the user with a voice transmission method similar to that in the real space.

Third Example Embodiment

Next, an information processing device according to a third example embodiment will be described. Some explanations overlapping the first example embodiment and the second example embodiment will be omitted.

[Details of Information Processing Device 101]

Figure 9:
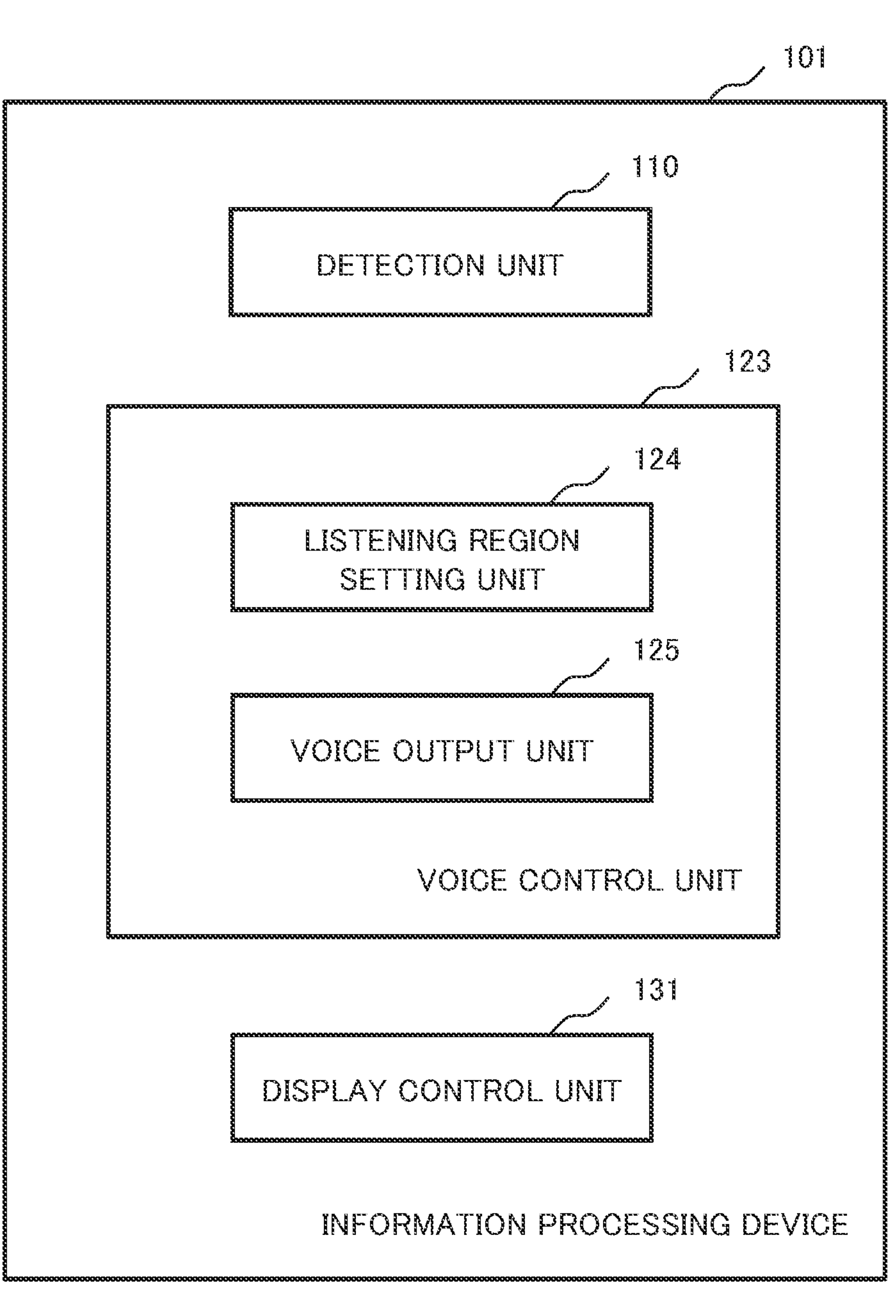
FIG. 9 is a block diagram illustrating an example of the functional configuration of an information processing device according to a third example embodiment of the present disclosure.

FIG. 9 is a block diagram illustrating an example of the functional configuration of the information processing device 101 according to the third example embodiment. The information processing device 101 is a device partially different in configuration from the information processing device 100 according to each of the first and second example embodiments. Similarly to the information processing device 100, the information processing device 101 is communicably connected to a plurality of user terminals 200 through a wireless or wired network. As illustrated in FIG. 9, the information processing device 101 includes a detection unit 110, a voice control unit 123, and a display control unit 131.

The voice control unit 123 includes a listening region setting unit 124 and a voice output unit 125. The listening region setting unit 124 may have the following functions in addition to the function of the listening region setting unit 121. The listening region setting unit 124 sets a volume control region in the listening region. The volume control region is a region where the volume to be output to the user of the avatar (that is, the listening avatar) present in the volume control region is set. Here, the volume of the voice output to the user of the listening avatar is referred to as an output volume.

Figure 10A:
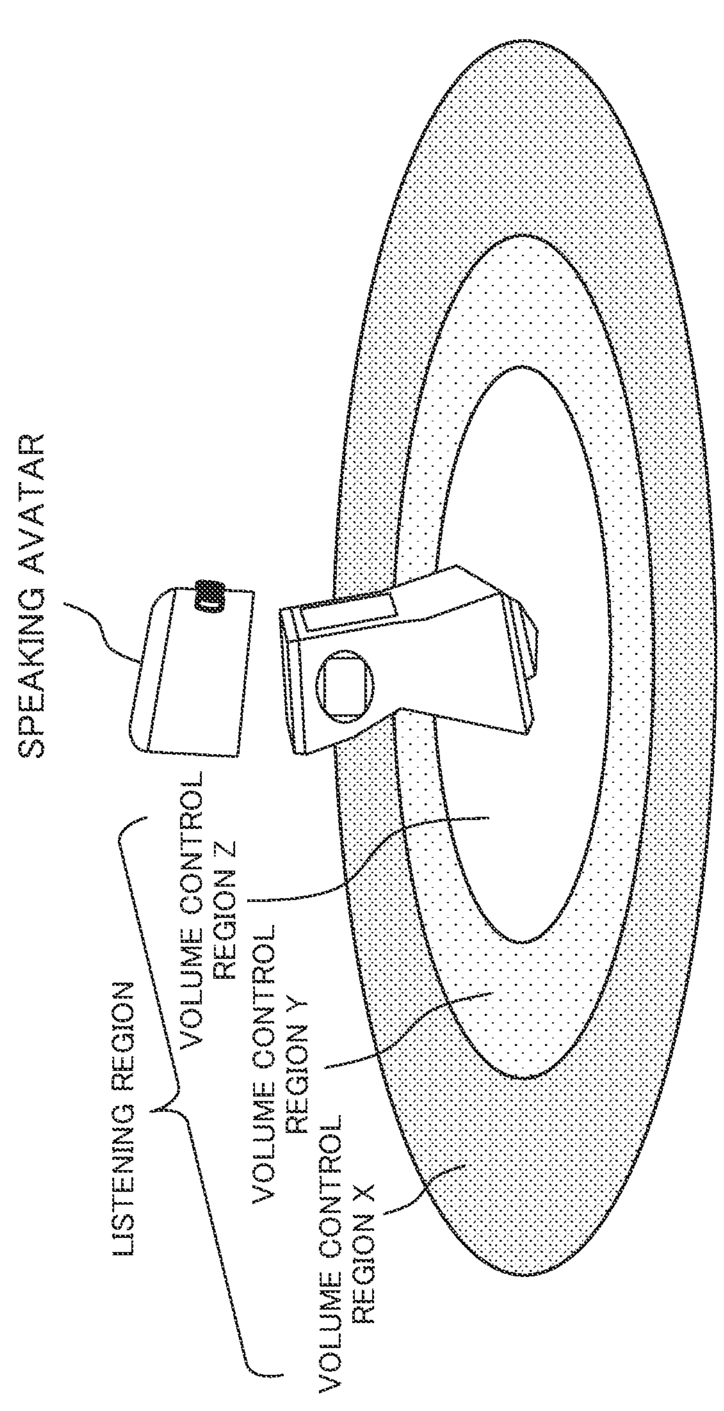
FIG. 10A is a diagram illustrating an example of a volume control region according to the third example embodiment of the present disclosure.

FIG. 10A is a diagram illustrating an example of the volume control region. As illustrated in FIG. 10A, the volume control region is included in the listening region. In this example, the listening region includes a volume control region X, a volume control region Y, and a volume control region Z. In each volume control region, an output volume is set. For example, the output volume of the user of the listening avatar present in the volume control region Y is larger than the output volume of the user of the listening avatar present in the volume control region X. For example, the output volume of the user of the listening avatar present in the volume control region Z is larger than the output volume of the user of the listening avatar present in the volume control region Y. In this manner, the output volume is set to increase as the distance between the speaking avatar and the listening avatar decreases.

The example of the volume control region is not limited to this example. FIG. 10B is a diagram illustrating another example of the volume control region. For example, as illustrated in FIG. 10B, the listening region setting unit 124 may set the volume control region according to the face direction of the speaking avatar, similarly to the listening region. In this case, the listening region setting unit 124 sets the volume control region to be large in a direction in which the avatar's face is facing. The number of volume control regions may be one or more, and is not limited to this example. The listening region setting unit 124 may set the size of the volume control region according to the volume of the voice of the speaking user.

The voice output unit 125 may have the following functions in addition to the function of the voice output unit 122. The voice output unit 125 outputs a voice with a different volume according to the position of the listening avatar. For example, in the example of FIG. 10A, it is assumed that there is one listening avatar in each of the volume control region X and the volume control region Y. In this case, the voice output unit 125 outputs a voice to the user of the listening avatar present in the volume control region Y with an output volume larger than that for the user of the listening avatar present in the volume control region X. That is, the voice output unit 125 outputs a voice with a larger output volume to the user of the listening avatar at a position closer to the position of the speaking avatar. In other words, the voice output unit 125 attenuates the output volume as the distance from the position of the speaking avatar increases.

In the above example, the listening region setting unit 124 sets the volume control region, but the method of controlling the output volume is not limited to this example. For example, the volume control region may not be set, and the voice output unit 125 may acquire the distance between the speaking avatar and the listening avatar. Then, the voice output unit 125 may control the output volume such that the output volume increases as the distance decreases.

In this manner, the voice control unit 123 controls the output volume, which is the volume to be output to the user of the listening avatar, according to the distance between the position of the speaking avatar and the position of the listening avatar and the volume of the voice.

Figure 11:
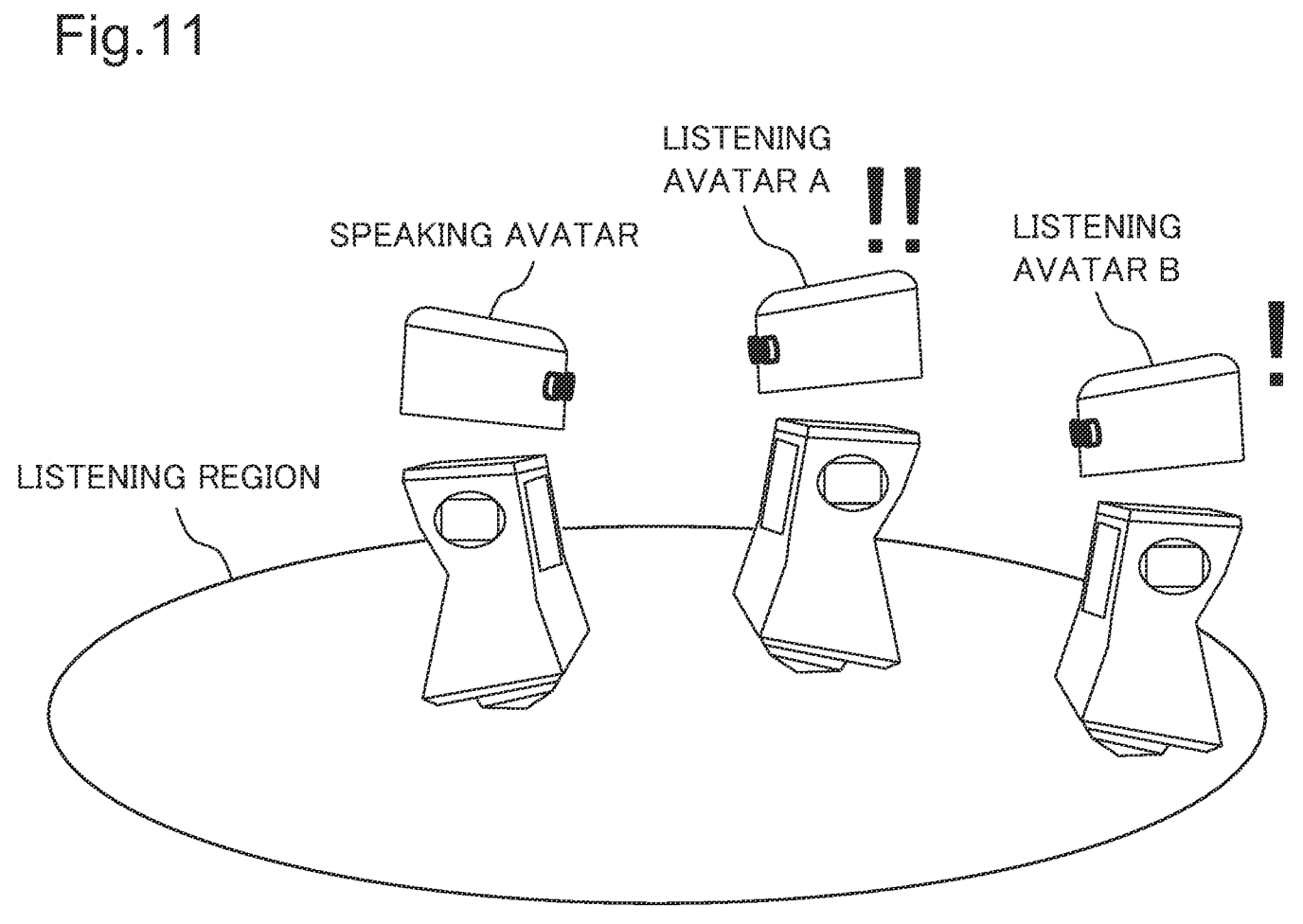

The display control unit 131 may have the following functions in addition to the function of the display control unit 130. The display control unit 131 may display the listening avatar in different display modes according to the output volume. FIG. 11 is a diagram illustrating an example of a display mode of the listening avatar. In the example of FIG. 11, a listening avatar A and a listening avatar B are present in the listening region. At this time, the listening avatar A is present at a position closer than the listening avatar B. Then, it is assumed that the voice output unit 125 outputs a voice to the user of the listening avatar A with an output volume larger than that for the user of the listening avatar B. In such a case, the display control unit 131 displays the listening avatar A and the listening avatar B in different display modes. In the example of FIG. 11, two exclamation marks are added to the listening avatar A, and one exclamation mark is added to the listening avatar B. As a result, the speaking user can visually recognize to which user the voice is transmitted at what output volume. The display mode is not limited to this example. For example, the display control unit 131 may add other different symbols or characters to the listening avatars having different output volumes, or may change the color of a part or entirety of the listening avatar for each listening avatar.

The display control unit 131 may display a volume control region. The display control unit 131 may display the volume control region in different display modes for each volume control region as in the examples of FIGS. 10A and 10B. That is, the display control unit 131 may display the listening region in different display modes according to the output volume.

[Operation Example of Information Processing Device 101]

Figure 12:
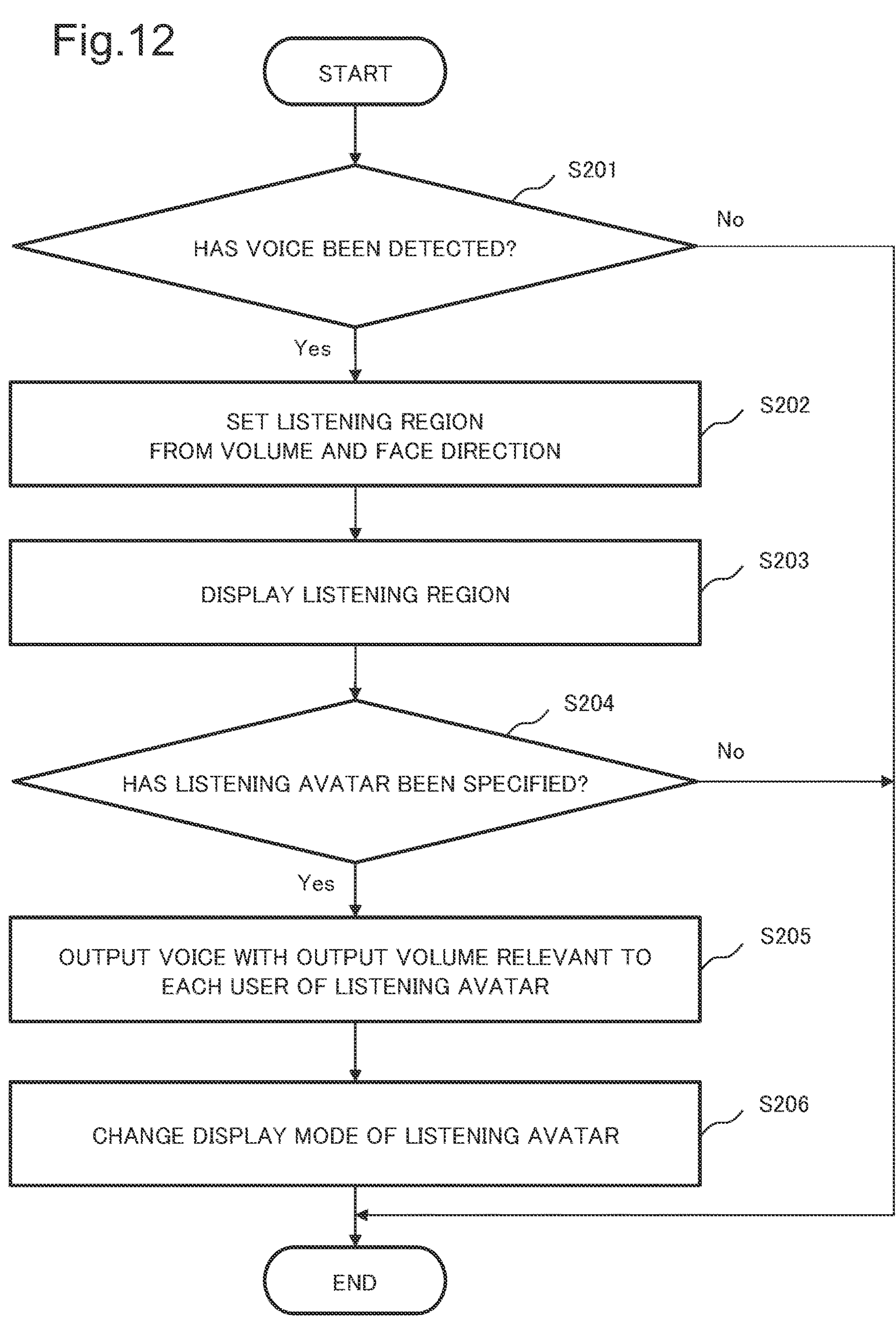
FIG. 12 is a flowchart illustrating an example of the operation of the information processing device according to the third example embodiment of the present disclosure.

Next, an example of the operation of the information processing device 101 will be described with reference to FIG. 12. FIG. 12 is a flowchart illustrating an example of the operation of the information processing device 101. When the detection unit 110 detects a voice ("Yes" in S201), the listening region setting unit 124 sets the listening region from the volume of the voice and the face direction of the speaking avatar (S202). At this time, the listening region setting unit 124 sets the listening region in consideration of at least one of the volume of the voice and the face direction of the speaking avatar. At this time, the listening region setting unit 124 may set the volume control region within the listening region. When the detection unit 110 detects no voice ("No" in S201), the information processing device 101 ends the processing.

The display control unit 131 displays the listening region (S203). At this time, the display control unit 131 may also display the volume control region. When the listening avatar is specified by the voice output unit 125 ("Yes" in S204), the voice output unit 125 outputs a voice with an output volume relevant to each user of the listening avatar (S205). At this time, the voice output unit 125 outputs a voice with an output volume corresponding to the position of the speaking avatar and the position of the listening avatar. The display control unit 131 changes the display mode of the listening avatar (S206). At this time, the display control unit 131 may display the listening avatar in different display modes according to the position of the listening avatar. When no listening avatar is specified by the voice output unit 125 ("No" in S204), the information processing device 101 ends the processing.

In the operation example described above, the processing of S203 may not be performed. The processing of S205 and the processing of S206 may be performed in reverse order.

In this manner, the information processing device 101 according to the third example embodiment may control the output volume, which is the volume to be output to the user of the listening avatar, according to the distance between the position of the speaking avatar and the position of the listening avatar and the volume of the voice. As a result, for example, when the voice of the speaking user is larger, the information processing device 101 can output a voice with a larger output volume to the user of the listening avatar. The information processing device 101 can output a voice with a larger output volume to the user of the listening avatar closer to the speaking avatar. As described above, the information processing device 101 can attenuate the output volume as the distance from the speaking avatar increases. Therefore, the information processing device 101 can provide the user with a voice transmission method similar to that in the real space.

The information processing device 101 according to the third example embodiment may display the listening avatar in different display modes according to the output volume. The information processing device 101 may display the listening region in different display modes according to the output volume. As a result, the information processing device 101 can inform the speaking user of which user the voice will be transmitted to at what volume.

Modification Examples

In the above example embodiments, examples have been described in which the range where the voice is transmitted, the output volume, and the like are set by the voice uttered by the speaking user. The range where the voice is transmitted or the output volume may be changed by the user's operation.

Figure 13:
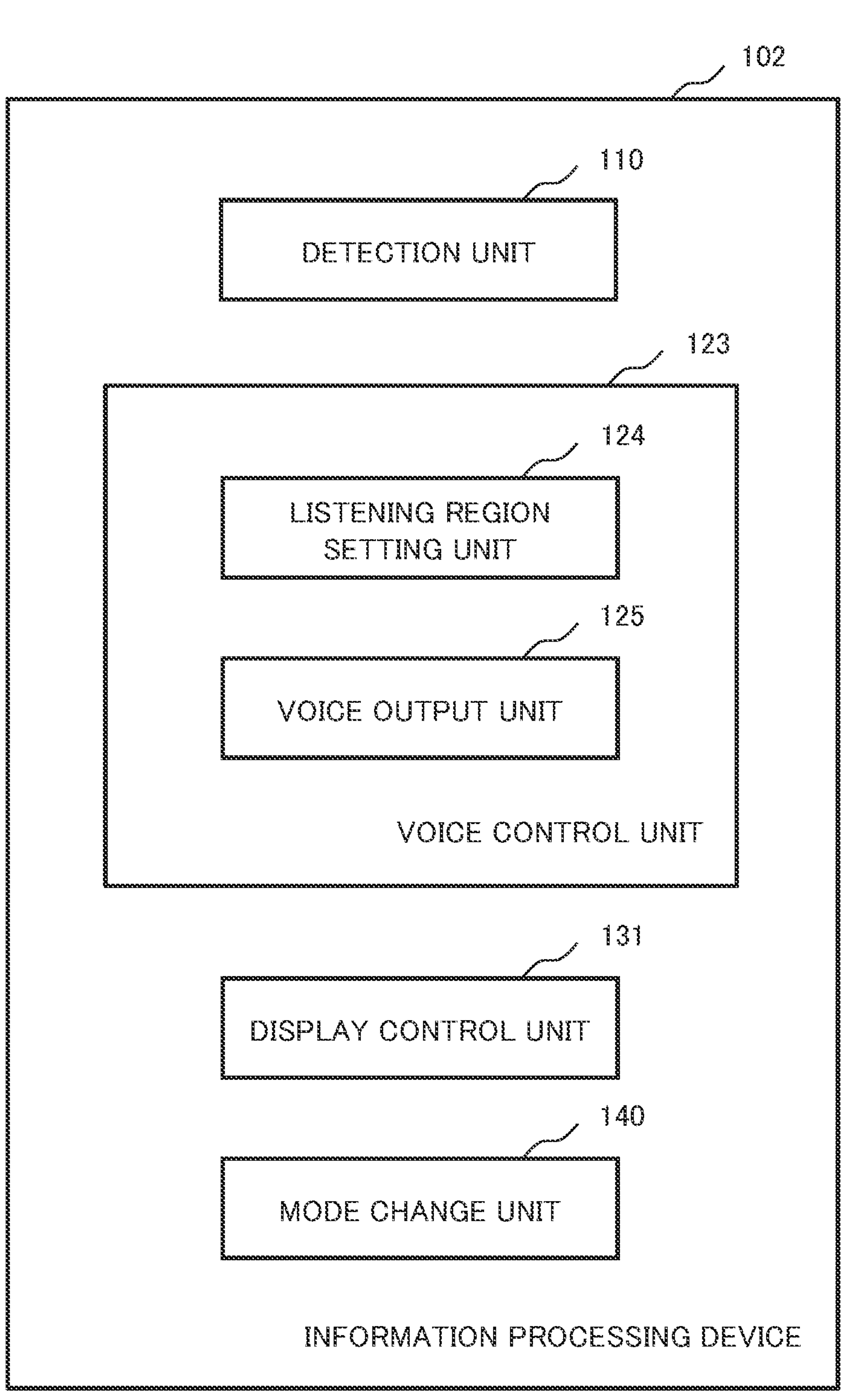
FIG. 13 is a block diagram illustrating an example of the functional configuration of an information processing device according to a modification example of the present disclosure.

FIG. 13 is a block diagram illustrating an example of the functional configuration of an information processing device 102 according to a modification example. As illustrated in FIG. 13, the information processing device 102 has a mode change unit 140 added to the information processing device 101.

The mode change unit 140 changes the mode of a voice output method. Examples of the mode include an automatic control mode and a user designation mode. The automatic control mode is a mode in which the range where the voice is transmitted, the output volume, and the like are automatically set by the voice uttered by the speaking user as described in the above example embodiment. The user designation mode is a mode in which the range where the voice is transmitted, the output volume, and the like are set by the user designation. The user selects a mode, for example, by operating the user terminal 200. The mode change unit 140 acquires information indicating the selected mode from the user terminal 200, and changes the mode to the selected mode.

It is assumed that the user selects the user designation mode. At this time, the mode change unit 140 receives designation of the transmission range or the output volume. At this time, the mode change unit 140 may receive, as the transmission range, designation of a predetermined region in the virtual space as a listening region, or may receive designation of a specific user as the transmission range.

When the designation of a region and an output volume is received by the mode change unit 140, the voice output unit 125 may output a voice with a designated volume, which is the designated output volume, to the user of the avatar in the designated region, for example. When the designation of a specific user and an output volume is received by the mode change unit 140, a voice may be output to the designated specific user with the designated volume.

The display control unit 131 may change the display mode of the avatar of the user to whom the voice is to be output. The display control unit 131 may display the designated region as the listening region.

<Examples of Application Scene>

Next, an example of a scene to which the information processing device of the present disclosure is applied will be described. The following description is merely an example, and the scene to which the information processing device of the present disclosure is applied is not limited to the following scene.

For example, when a disaster occurs, a disaster management office is established to cooperate with a person at a remote place and share information. In such a case, the user communicates with members of the disaster management office through the virtual space. For example, it is assumed that members of the disaster management office are divided into a plurality of groups and hold a meeting in the virtual space. When a user is holding a meeting in one group, the user hears the voices of other groups with the volume attenuated. Therefore, the user can grasp the progress status of other groups. The user can sense the noise around him or her and can detect changes in the situation.

<Configuration Example of Hardware of Information Processing Device>

Figure 14:
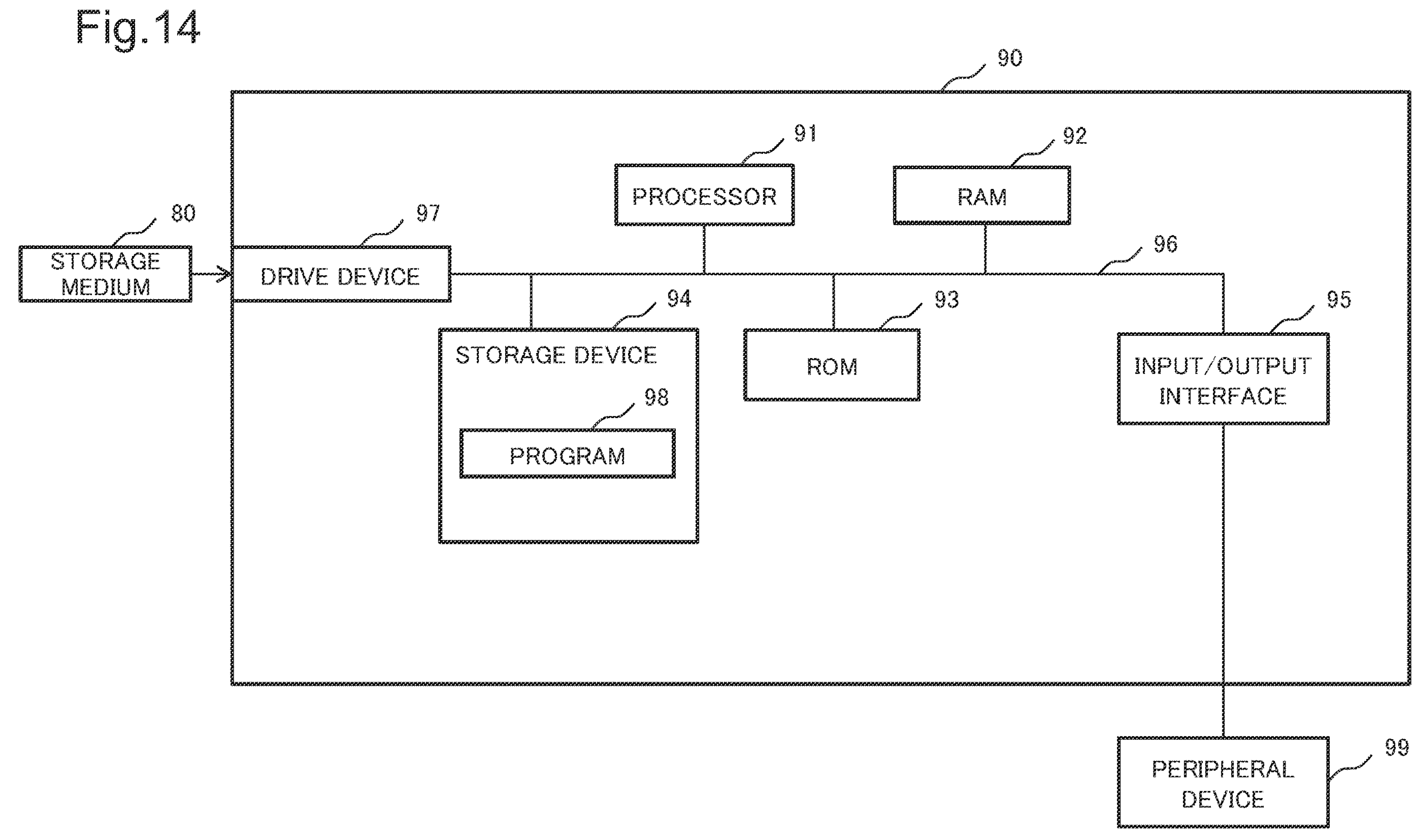
FIG. 14 is a block diagram illustrating an example of the hardware configuration of a computer device that implements the information processing devices according to the first, second, and third example embodiments of the present disclosure.

Hardware forming the information processing devices according to the first, second, and third example embodiments will be described. FIG. 14 is a block diagram illustrating an example of the hardware configuration of a computer device that implements the information processing device according to each example embodiment. In a computer device 90, the information processing device and the information processing method described in each example embodiment and each modification example are implemented.

As illustrated in FIG. 14, the computer device 90 includes a processor 91, a random access memory (RAM) 92, a read only memory (ROM) 93, a storage device 94, an input/output interface 95, a bus 96, and a drive device 97. The information processing device may be implemented by a plurality of electric circuits.

The storage device 94 stores a program (computer program) 98. The processor 91 executes the program 98 of the information processing device using the RAM 92. Specifically, for example, the program 98 includes a program causing a computer to execute the processes illustrated in FIGS. 4, 8, and 12. When the processor 91 executes the program 98, the functions of the components of the information processing device are enabled. The program 98 may be stored in the ROM 93. The program 98 may be recorded in a storage medium 80 and read using the drive device 97, or may be transmitted from an external device (not illustrated) to the computer device 90 through a network (not illustrated).

Through the input/output interface 95, data is transmitted to and received from a peripheral device 99 (a keyboard, a mouse, a display device, and the like). The input/output interface 95 functions as a means for acquiring or outputting data. The bus 96 connects the components to each other.

There are various modification examples of the method for implementing the information processing device. For example, the information processing device can be implemented as a dedicated device. The information processing device can be implemented based on a combination of a plurality of devices.

A processing method in which a program for implementing each component in the function of each example embodiment is recorded in a storage medium and the program recorded in the storage medium is read as a code and executed in a computer is also included in the scope of each example embodiment. That is, a computer-readable storage medium is also included in the scope of each example embodiment. A storage medium in which the above-described program is recorded and the program itself are also included in each example embodiment.

The storage medium is, for example, a floppy (registered trademark) disk, a hard disk, an optical disk, a magneto-optical disk, a compact disc (CD)-ROM, a magnetic tape, a nonvolatile memory card, or a ROM, but is not limited to this example. The program recorded in the storage medium is not limited to a program that executes processing alone, and programs that operate on an operating system (OS) to execute processing in cooperation with other software and functions of an extension board are also included in the scope of each example embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The above-described example embodiments and modification examples can be appropriately combined.

Some or all of the above example embodiments may be described as the following supplementary notes, but are not limited to the following.

<Supplementary Notes>

[Supplementary Note 1]

An information processing device, including:

a detection means for detecting a voice uttered by a user who operates an avatar in a virtual space;

a voice control means for outputting the voice to a user of an avatar satisfying predetermined conditions in a relationship with a speaking avatar that is an avatar operated by the user who has uttered the voice; and a display control means for changing a display mode of a listening avatar that is an avatar satisfying the predetermined conditions.

[Supplementary Note 2]

The information processing device according to Supplementary Note 1, wherein the voice control means sets a listening region that is a region including the speaking avatar, sets an avatar present in the listening region as the listening avatar, and outputs the voice to a user of the listening avatar.

[Supplementary Note 3]

The information processing device according to Supplementary Note 2, wherein the display control means displays the listening region.

[Supplementary Note 4]

The information processing device according to Supplementary Note 2 or 3, wherein the voice control means sets the listening region according to a volume of the voice uttered by the user.

[Supplementary Note 5]

The information processing device according to any one of Supplementary Notes 2 to 4, wherein the voice control means determines the listening region according to a face direction of the listening avatar.

[Supplementary Note 6]

The information processing device according to any one of Supplementary Notes 2 to 5, wherein the voice control means controls an output volume, which is a volume to be output to the user of the listening avatar, according to a distance between a position of the speaking avatar and a position of the listening avatar and a volume of the voice.

[Supplementary Note 7]

The information processing device according to Supplementary Note 6, wherein the display control means displays the listening avatar in different display modes according to the output volume.

[Supplementary Note 8]

The information processing device according to Supplementary Note 6 or 7, wherein the display control means displays the listening region in different display modes according to the output volume.

[Supplementary Note 9]

The information processing device according to any one of Supplementary Notes 1 to 8, further including:

a mode change means for changing a mode of a method for outputting the voice, wherein, when a selection of a user designation mode is received, the mode change means further receives a designation of a transmission range indicating a target to which the voice is to be transmitted and a volume for outputting the voice, and the voice control means outputs the voice with a designated volume to a user of an avatar in the transmission range.

[Supplementary Note 10]

An information processing method, including:

detecting a voice uttered by a user who operates an avatar in a virtual space;

outputting the voice to a user of an avatar satisfying predetermined conditions in a relationship with a speaking avatar that is an avatar operated by the user who has uttered the voice; and changing a display mode of a listening avatar that is an avatar satisfying the predetermined conditions.

[Supplementary Note 11]

The information processing method according to Supplementary Note 10, wherein, in the outputting of the voice, a listening region that is a region including the speaking avatar is set, an avatar present in the listening region is set as the listening avatar, and the voice is output to a user of the listening avatar.

[Supplementary Note 12]

The information processing method according to Supplementary Note 11, wherein, in the changing, the listening region is displayed.

[Supplementary Note 13]

The information processing method according to Supplementary Note 11 or 12, wherein, in the outputting of the voice, the listening region is set according to a volume of the voice uttered by the user.

[Supplementary Note 14]

The information processing method according to any one of Supplementary Notes 11 to 13, wherein, in the outputting of the voice, the listening region is set according to a face direction of the listening avatar.

[Supplementary Note 15]

The information processing method according to any one of Supplementary Notes 11 to 14, wherein, in the outputting of the voice, an output volume that is a volume to be output to the user of the listening avatar is controlled according to a distance between a position of the speaking avatar and a position of the listening avatar and a volume of the voice.

[Supplementary Note 16]

The information processing method according to Supplementary Note 15, wherein, in the outputting of the voice, the listening avatar is displayed in different display modes according to the output volume.

[Supplementary Note 17]

The information processing method according to Supplementary Note 15 or 16, wherein, in the changing, the listening region is displayed in different display modes according to the output volume.

[Supplementary Note 18]

The information processing method according to any one of Supplementary Notes 10 to 17, further including:

further receiving a designation of a transmission range indicating a target to which the voice is to be transmitted and a volume for outputting the voice when a selection of a user designation mode is received, wherein, in the outputting of the voice, the voice is output to a user of an avatar in the transmission range with a designated volume.

[Supplementary Note 19]

A computer-readable storage medium storing a program causing a computer to execute:

processing for detecting a voice uttered by a user who operates an avatar in a virtual space;

processing for outputting the voice to a user of an avatar satisfying predetermined conditions in a relationship with a speaking avatar that is an avatar operated by the user who has uttered the voice; and processing for changing a display mode of a listening avatar that is an avatar satisfying the predetermined conditions.

[Supplementary Note 20]

The computer-readable storage medium according to Supplementary Note 19, wherein, in the processing for outputting the voice, a listening region that is a region including the speaking avatar is set, an avatar present in the listening region is set as the listening avatar, and the voice is output to a user of the listening avatar.

[Supplementary Note 21]

The computer-readable storage medium according to Supplementary Note 20, wherein, in the change processing, the listening region is displayed.

[Supplementary Note 22]

The computer-readable storage medium according to Supplementary Note 20 or 21, wherein, in the processing for outputting the voice, the listening region is set according to a volume of the voice uttered by the user.

[Supplementary Note 23]

The computer-readable storage medium according to any one of Supplementary Notes 20 to 22, wherein, in the processing for outputting the voice, the listening region is set according to a face direction of the listening avatar.

[Supplementary Note 24]

The computer-readable storage medium according to any one of Supplementary Notes 20 to 23, wherein, in the processing for outputting the voice, an output volume that is a volume to be output to the user of the listening avatar is controlled according to a distance between a position of the speaking avatar and a position of the listening avatar and a volume of the voice.

[Supplementary Note 25]

The computer-readable storage medium according to Supplementary Note 24, wherein, in the processing for outputting the voice, the listening avatar is displayed in different display modes according to the output volume.

[Supplementary Note 26]

The computer-readable storage medium according to Supplementary Note 24 or 25, wherein, in the change processing, the listening region is displayed in different display modes according to the output volume.

[Supplementary Note 27]

The computer-readable storage medium according to any one of Supplementary Notes 19 to 26, wherein, when a selection of a user designation mode is received, a designation of a transmission range indicating a target to which the voice is to be transmitted and a volume for outputting the voice is further received, and in the processing for outputting of the voice, the voice is output to a user of an avatar in the transmission range with a designated volume.

REFERENCE SIGNS LIST

100, 101 information processing device
110 detection unit
120, 123 voice control unit
121, 124 listening region setting unit
122, 125 voice output unit
130, 131 display control unit
140 mode change unit
200 user terminal

What is claimed is:

1. An information processing device comprising:

one or more memories storing instructions; and one or more processors configured to execute the instructions to:

set a size of a sound control area according to sound information, wherein the sound information comprises a volume of a sound related to a first avatar;

set the size of the sound control area larger as the volume increases and set the size of the sound control area smaller as the volume decreases;

output the sound information to a second avatar, different from the first avatar, when the second avatar is within the sound control area and not when the second avatar is outside the sound control area; and output, to a display, a visual indicator indicating that the sound information is being output to the second avatar when the second avatar is within the sound control area and is not output when the second avatar is outside the sound control area.

2. The information processing device according to claim 1, wherein the first avatar is a speaking avatar, wherein the second avatar is a listening avatar, and wherein the one or more processors are configured to further execute the instructions to:

set a listening region that is a region including the speaking avatar;

set an avatar present in the listening region as the listening avatar; and output a voice to a user of the listening avatar.

3. The information processing device according to claim 2, wherein the one or more processors are configured to execute the instructions to display the listening region.

4. The information processing device according to claim 2, wherein the one or more processors are configured to execute the instructions to set the listening region according to a volume of a voice uttered by a user of the speaking avatar.

5. The information processing device according to claim 2, wherein the one or more processors are configured to execute the instructions to determine the listening region according to a face direction of the listening avatar.

6. The information processing device according to claim 2, wherein the one or more processors are configured to execute the instructions to control an output volume, which is a volume to be output to the user of the listening avatar, according to a distance between a position of the speaking avatar and a position of the listening avatar, and a volume of a voice uttered by a user of the speaking avatar.

7. The information processing device according to claim 6, wherein the one or more processors are configured to execute the instructions to display the listening avatar in different display modes according to the output volume.

8. The information processing device according to claim 6, wherein the one or more processors are configured to execute the instructions to display the listening region in different display modes according to the output volume.

9. The information processing device according to claim 1, wherein the one or more processors are configured to further execute the instructions to:

change a mode of a method for outputting the sound information;

in a case where a selection of a user designation mode is received, receive a designation of a transmission range indicating a target to which the sound information is to be transmitted and a volume for outputting the sound information; and output the sound information with a designated volume to a user of an avatar in the transmission range.

10. The information processing device according to claim 1, wherein the one or more processors are configured to set sizes of sound control areas for multiple volume ranges, and wherein the size of the sound control area is set based on one of the multiple volume ranges in which the volume of the sound related to the first avatar is included.

11. The information processing device according to claim 1, wherein the sound information is output within the sound control area at a predetermined volume.

12. The information processing device according to claim 1, wherein the one or more processors are configured to acquire the sound information within a virtual space.

13. The information processing device of claim 1, wherein the size of the sound control area is further set based on a direction of a face of the first avatar.

14. An information processing method comprising:

setting, by one or more processors, a size of a sound control area according to sound information, wherein the sound information comprises a volume of a sound related to a first avatar;

setting, by the one or more processors, the size of the sound control area larger as the volume increases and setting, by the one or more processors, the size of the sound control area smaller as the volume decreases;

outputting, by the one or more processors, the sound information to a second avatar, different from the first avatar, when the second avatar is within the sound control area and not when the second avatar is outside the sound control area; and outputting, to a display, a visual indicator indicating that the sound information is being output to the second avatar when the second avatar is within the sound control area and is not output when the second avatar is outside the sound control area.

15. The information processing method according to claim 14, wherein the first avatar is a speaking avatar, wherein the second avatar is a listening avatar, and wherein the information processing method further comprises:

setting a listening region that is a region including the speaking avatar;

setting an avatar present in the listening region as the listening avatar; and outputting a voice to a user of the listening avatar.

16. The information processing method according to claim 15, further comprising displaying the listening region.

17. The information processing method according to claim 15, further comprising setting the listening region according to a volume of a voice uttered by a user of the speaking avatar.

18. The information processing method according to claim 15, further comprising setting the listening region according to a face direction of the listening avatar.

19. The information processing method according to claim 15, further comprising controlling an output volume that is a volume to be output to the user of the listening avatar according to a distance between a position of the speaking avatar and a position of the listening avatar and a volume of a voice uttered by a user of the speaking avatar.

20. The information processing method according to claim 19, further comprising displaying the listening avatar in different display modes according to the output volume.

21. The information processing method according to claim 19, further comprising displaying the listening region in different display modes according to the output volume.

22. The information processing method according to claim 14, further comprising:

receiving a designation of a transmission range indicating a target to which the sound information is to be transmitted and a volume for outputting the sound information when a selection of a user designation mode is received; and outputting the sound information with a designated volume to a user of an avatar in the transmission range.

23. A non-transitory computer-readable storage medium storing a program causing a computer to execute operations comprising:

setting, by one or more processors, a size of a sound control area according to sound information, wherein the sound information comprises a volume of a sound related to a first avatar;

setting, by the one or more processors, the size of the sound control area larger as the volume increases and setting, by the one or more processors, the size of the sound control area smaller as the volume decreases;

outputting, by the one or more processors, the sound information to a second avatar, different from the first avatar, when the second avatar is within the sound control area and not when the second avatar is outside the sound control area; and outputting, to a display, a visual indicator indicating that the sound information is being output to the second avatar when the second avatar is within the sound control area and is not output when the second avatar is outside the sound control area.

24. The non-transitory computer-readable storage medium according to claim 23, wherein the first avatar is a speaking avatar, wherein the second avatar is a listening avatar, and wherein the information processing method further comprises:

setting a listening region that is a region including the speaking avatar;

setting an avatar present in the listening region as the listening avatar; and outputting a voice to a user of the listening avatar.

* * * * *